US008225082B2

(12) United States Patent
Hans et al.

(10) Patent No.: US 8,225,082 B2
(45) Date of Patent: *Jul. 17, 2012

(54) CARD DEVICE FOR LOADING APPLICATIONS TO A MOBILE DEVICE

(75) Inventors: Sebastian J. Hans, Berlin (DE); Eduard K. de Jong, Narberth (GB)

(73) Assignee: Oracle America, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/065,626

(22) Filed: Mar. 24, 2011

(65) Prior Publication Data
US 2011/0177803 A1 Jul. 21, 2011

Related U.S. Application Data

(63) Continuation of application No. 11/374,937, filed on Mar. 13, 2006, now Pat. No. 7,941,656.

(30) Foreign Application Priority Data

Mar. 16, 2005 (EP) ..................................... 05005728

(51) Int. Cl.
*G06F 9/00* (2006.01)
*G06F 9/24* (2006.01)
(52) U.S. Cl. ................. 713/2; 713/1; 713/100; 713/191; 713/189; 713/190; 455/418; 455/419; 455/420; 455/558; 455/414.1; 455/432.3; 455/403; 709/220; 709/217; 717/168; 717/169; 717/170; 717/171; 717/172
(58) Field of Classification Search .................. None
See application file for complete search history.

(56) References Cited

U.S. PATENT DOCUMENTS

| 6,039,247 | A  | * | 3/2000 | Reccia et al. ................. 235/379 |
| 6,250,557 | B1 | * | 6/2001 | Forslund et al. .............. 235/492 |
| 6,788,926 | B1 | * | 9/2004 | Frangione et al. ............ 455/405 |
| 6,978,453 | B2 | * | 12/2005 | Rao et al. ....................... 717/171 |
| 6,996,818 | B2 | * | 2/2006 | Jacobi et al. .................. 717/170 |
| 7,058,890 | B2 | * | 6/2006 | George et al. ................. 715/728 |
| 7,072,666 | B1 | * | 7/2006 | Kullman et al. ........... 455/456.1 |
| 7,139,372 | B2 | * | 11/2006 | Chakravorty et al. ... 379/114.01 |
| 7,146,156 | B2 | * | 12/2006 | Zicker et al. .................. 455/411 |
| 7,197,322 | B1 | * | 3/2007 | Rayburn et al. ............ 455/456.1 |

(Continued)

FOREIGN PATENT DOCUMENTS
EP 1 331 559 7/2003
(Continued)

*Primary Examiner* — Syed A. Zia
(74) *Attorney, Agent, or Firm* — Fliesler Meyer LLP

(57) ABSTRACT

A system for loading application identifiers to a mobile device includes a mobile device, a card device insertable into the mobile device, and an application center. The card device is adapted to determine an effective mobile device identifier of the mobile device, and transmit the effective mobile device identifier to the application center. The effective mobile device identifier is based at least in part on the result of a process performed by the card device. The application center is adapted to (1) determine zero or more allotted application identifiers and zero or more application identifiers of applications loaded on the mobile device based at least in part on the effective mobile device identifier, (2) identify at least one application identifier of the zero or more allotted application identifiers which does not form part of the zero or more application identifiers of applications loaded on the mobile device, and (3) load the at least one application identifier to the mobile device.

11 Claims, 10 Drawing Sheets

U.S. PATENT DOCUMENTS

| | | | |
|---|---|---|---|
| 7,258,267 B2 * | 8/2007 | Choi | 235/379 |
| 7,353,211 B2 * | 4/2008 | Hans et al. | 705/67 |
| 7,496,193 B2 * | 2/2009 | Nachef et al. | 379/357.01 |
| 7,941,656 B2 * | 5/2011 | Hans et al. | 713/2 |
| 8,014,799 B2 * | 9/2011 | Kuk et al. | 455/466 |
| 8,078,158 B2 * | 12/2011 | Backholm | 455/419 |
| 2002/0128984 A1 * | 9/2002 | Mehta et al. | 705/71 |
| 2002/0131404 A1 * | 9/2002 | Mehta et al. | 370/352 |
| 2003/0023963 A1 | 1/2003 | Birkholz et al. | |
| 2004/0153767 A1 * | 8/2004 | Dolgonos | 714/18 |
| 2005/0143059 A1 * | 6/2005 | Imura | 455/419 |
| 2007/0079142 A1 * | 4/2007 | Leone et al. | 713/193 |
| 2009/0318171 A1 * | 12/2009 | Backholm et al. | 455/466 |
| 2010/0146500 A1 * | 6/2010 | Joubert et al. | 717/178 |

FOREIGN PATENT DOCUMENTS

| | | |
|---|---|---|
| EP | 1331559 A2 * | 7/2003 |
| EP | 1 498 812 | 1/2005 |
| EP | 1 538 855 | 6/2005 |
| EP | 1538855 A2 * | 6/2005 |
| WO | WO 02/44892 | 6/2002 |
| WO | WO 03/073273 | 9/2003 |
| WO | WO 2010119427 A2 * | 10/2010 |

* cited by examiner

CARD DEVICE FOR LOADING APPLICATIONS TO A MOBILE DEVICE

FIELD OF THE INVENTION

The present invention relates to the field of computer science, and more particularly to a card device for loading applications to a mobile device.

BACKGROUND OF THE INVENTION

Wireless communication networks are becoming increasingly popular and are widely used for communications in private and business environments. Wireless networks allow a wireless transmission of information between users, e.g. during a telephone conversation between telephone terminals or a data communication between computing devices. Wireless networks generally operate according to a wireless communication standard, examples being the GSM (Global System for Mobile Communications) standard, the UMTS (Universal Mobile Telecommunications System) standard, also known as wide band CDMA (WCDMA), the CDMA2000 (Code Division Multiple Access 2000) standard, wireless local area network (WLAN) standards and others.

Mobile communications networks are one type of wireless communication network that generally allows a user of a mobile device to at least roam within the coverage area of the serving network, and communications may be handed over between individual cells of the mobile network. Furthermore, fixed wireless networks are another type of wireless communication network, which generally only allows a movement of a wireless device within a smaller defined area, such as an office or home.

A mobile telephone is one type of wireless communication device, widely used in voice communications, data communications, or both. Similarly, a mobile computer is a type of wireless communication device which is able to connect to wireless communication networks for data transmission, for assisting in voice communications with other communications or computing devices, or both.

Mobile devices such as mobile telephones or mobile computing devices may include a card device for enabling access to a wireless network or a plurality of different wireless networks. The card device can be a type of plastic card embedded with a computer chip for storing data and for carrying out processing operations to enable the mobile device to access the network or networks. The card device may store information pertaining to a particular user or subscriber of a network, allowing a network operator to identify the user for properly directing calls to the user, for providing features of subscribed services, for billing purposes and other purposes. The card device may be insertable into the mobile device, into a dedicated slot or receiving compartment.

Newer mobile devices typically have substantial computing power and are thus becoming increasingly versatile. In addition to offering simple communication services, e.g. voice communication services, newer mobile devices may also offer data services for virtually any type of application, such as information services, maintenance of personal information, purchasing transactions, banking services, and other services.

Accordingly, the mobile devices will be required to hold a number of different mobile application programs, for operating the mobile device and for enabling service provision.

The application programs may be installed on a mobile control unit of the mobile device, or may be installed on the card device. An application may be installed on the mobile device when the mobile device is put into service, e.g. during manufacture of the mobile device, when entering a service contract with a user, or similar. Furthermore, applications may be installed on a card device upon putting a card device into service, including making a service contract with a user, upon manufacturing the card device, or similar. Thus, the mobile device and the card device will be equipped with a certain initial set of applications available for a user.

However, if at a later point in time during regular operation of the mobile device requirements change, or if new services are subscribed to, an operator of the wireless network may want to install, remove or update applications available on the mobile control unit, the card device, or both.

It is conceivable to load applications onto the mobile control unit, the card device, or both, in a specific service mode entered by a user, where the wireless link between the network and the mobile device is used for downloading applications. However, this may require substantial user interaction in selecting applications, and controlling the downloading of applications, which may lead to errors. Furthermore, as the network may not have full knowledge about applications or versions of applications available on the mobile device, applications may be loaded repeatedly or not at all.

SUMMARY OF THE INVENTION

A system for loading application identifiers to a mobile device includes a mobile device, a card device insertable into the mobile device, and an application center. The card device is adapted to determine an effective mobile device identifier of the mobile device, and transmit the effective mobile device identifier to the application center. The effective mobile device identifier is based at least in part on the result of a process performed by the card device. The application center is adapted to (1) determine zero or more application identifiers of applications loaded on the mobile device and zero or more allotted application identifiers based at least in part on the effective mobile device identifier, (2) identify at least one application identifier of the zero or more allotted application identifiers which does not form part of the zero or more application identifiers of applications loaded on the mobile device, and (3) load the at least one application identifier to the mobile device.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIG. 7 is a continuation of FIG. 6.

FIG. 8 is a continuation of FIG. 7.

FIG. 9 is a continuation of FIG. 8.

DETAILED DESCRIPTION

Figure 1:
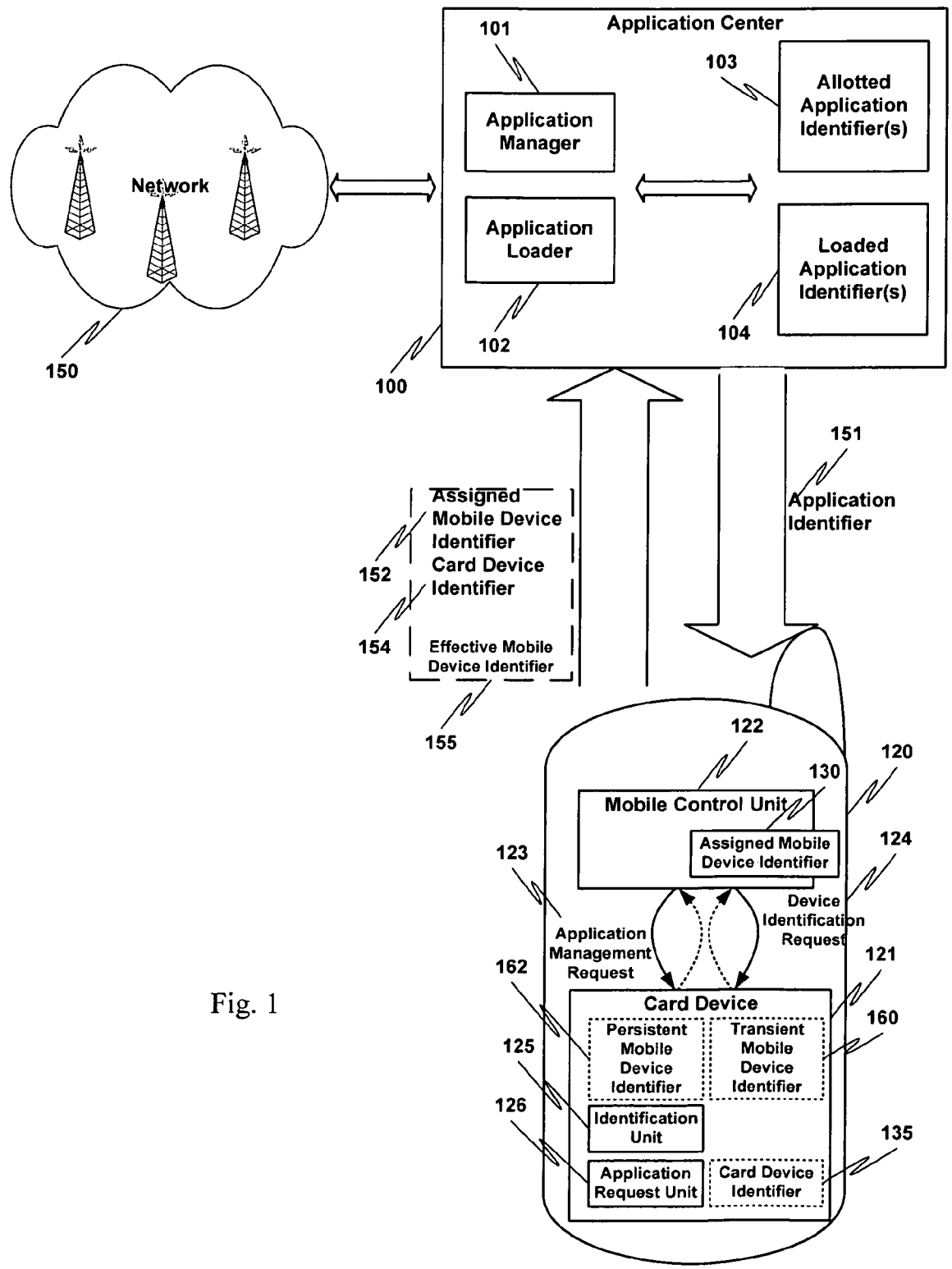
FIG. 1 is a block diagram that illustrates a communication environment for loading an application identifier to a mobile device in accordance with one embodiment of the present invention.

Embodiments of the present invention are described herein in the context of a system for loading applications to a mobile device. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available from Microsoft Corporation of Redmond, Wash., or various versions of the Unix operating system such as Linux available from a number of vendors. The method may also be implemented on a mobile device running an OS such as Windows® CE, available from Microsoft Corporation of Redmond, Wash., Symbian OS™, available from Symbian Ltd of London, UK, Palm OS®, available from PalmSource, Inc. of Sunnyvale, Calif., and various embedded Linux operating systems. Embedded Linux operating systems are available from vendors including MontaVista Software, Inc. of Sunnyvale, Calif., and FSMLabs, Inc. of Socorro, N. Mex. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of this description, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of this description, the term "randomized" describes the result of a random or pseudo-random number generation process. A "randomized process" describes the application of such a result to a process. Methods of generating random and pseudo-random numbers are known by those skilled in the relevant art.

In the context of this description, the term "identifier" describes one or more numbers, characters, symbols, or the like. More generally, an "identifier" describes any entity that can be represented by one or more bits.

In the context of this description, the term "application identifier" describes different applications with different functionality, different versions of the same application, or both. Thus, for example a version V1.1 of a particular service application can be considered to constitute a first application, while a version V1.2 of the same service application can be considered to constitute a second application.

In the context of this description, an application identifier is "allotted" to a device such as a mobile device or a card device if the executable application code that implements the application is enabled for use on that particular type of device (i.e. the application code is capable of running on the type of mobile device), and if the application code is allowed for use on the particular device (i.e. the device user has paid for use of a service enabled by the application).

In the context of this description, the term "loading an application identifier" describes any operation or sequence of operations for installing or making available an application on a device, i.e. on the mobile control unit, the card device, or both. This includes compiling, downloading or storing coded instructions of an application on the card device or mobile control unit, such that, upon execution, the functionality of the application can be realized and utilized. Furthermore, the expression "loading application identifiers" as used in this description may refer to the operation of transferring one or more application identifiers, e.g. from an application center towards the mobile device, i.e. loading does not necessarily also include installing the application at the mobile device.

In the context of this description, the term "releasing an application identifier" describes any operation or sequence of operations for uninstalling or making unavailable an application on a device, i.e. on the mobile control unit, the card device, or both. Releasing an application identifier may include releasing files associated with an application, such as image files. An application identifier may be released to increase availability of memory space or if application identifiers are no longer required for other reasons, such as if a certain service is unsubscribed, if a service provision is terminated at the mobile device, or for other reasons.

In the context of this description, the term "mobile device application identifier" describes an application identifier associated with an application for loading on a mobile device.

In the context of this description, the term "card device application identifier" describes an application identifier associated with an application for loading on a card device.

In the context of this description, an assigned mobile device identifier describes an identifier assigned to a mobile device prior to being issued to a mobile device user.

In the context of this description, an assigned card device identifier describes an identifier assigned to a card device prior to being issued to a card device user or being configured with a mobile device.

Turning now to FIG. 1, a block diagram that illustrates a communication environment for loading application identifiers to a mobile device in accordance with one embodiment of the present invention is presented. The embodiment enables convenient downloading of application identifiers from an application center 100 to a mobile device 120 by maintaining information regarding application identifiers allotted to mobile device 120. Application center 100 may also maintain information regarding identifiers of applications loaded on mobile device 120. Application center 100 may also maintain a relationship between one or more assigned mobile device identifiers and one or more card device identifiers, where an assigned card device identifier uniquely identifies a card device and an assigned mobile device identifier uniquely identifies a mobile device. Based at least in part on a comparison of the application identifiers already loaded on mobile device 120 and application identifiers allotted for mobile device 120, application center 100 determines additional application identifiers to be downloaded to the mobile device 120. Thus, application center 100 ensures a desired set of application identifiers on mobile device 120, without requiring extensive user interaction and by reducing communication overhead.

Still referring to FIG. 1, application center 100 is shown to include an application manager 101, an application loader 102, zero or more allotted application identifiers 103, and zero or more application identifiers 104 of applications loaded on mobile device 120. Furthermore, FIG. 1 illustrates mobile device 120 including a card device 121 and a mobile control unit 122. Card device 121 may be removably attached to mobile device 120.

In operation, application manager 101 of application center 100 determines zero or more allotted application identifiers 103, and zero or more application identifiers 104 of applications loaded on mobile device 120, based at least in part on an effective mobile device identifier 155 of mobile device 120. Application manager 101 also identifies at least one application identifier of the zero or more allotted application identifiers 103, which does not form part of the zero or more application identifiers 104 of applications loaded on the mobile device 120. Effective mobile device identifier 155 is based at least in part on the result of a process performed by card device 121. Application loader 102 of the application center 100 then loads the at least one application identifier to mobile device 120.

According to one embodiment of the present invention, application center 100 maintains a comprehensive overview of application identifiers allotted to and loaded to mobile device 120, or a plurality of mobile devices. Application center 100 loads only application identifiers, including different versions thereof, to mobile device 120, which are not already available at mobile device 120.

To enable application center 100 to determine the zero or more allotted application identifiers 103, and the zero or more application identifiers 104 of applications loaded on mobile device 120, an assigned mobile device identifier 130 is transmitted by mobile device 120 to application center 100 as illustrated with reference numeral 152 in FIG. 1. More precisely, card device 121 of mobile device 120 includes an application request unit 126 that responds to an application management request and an identification unit 125 that responds to a device identification request 124. Device identification request 124 is made by mobile control unit 122 to transfer assigned mobile device identifier 130 to card device 121, and application management request 123 is made by mobile control unit 122 to transfer effective mobile device identifier 155 including the assigned mobile device identifier 152 from card device 120 to application center 100. Upon receipt of effective mobile device identifier 155, application center 100: (i) determines the zero or more allotted application identifiers 103, and the zero or more application identifiers 104 of applications loaded on mobile device 120 based at least in part on the received effective mobile device identifier 155; (ii) identifies at least one application identifier of the zero or more allotted application identifiers 103 that does not form part of the zero or more application identifiers 104 of applications loaded on mobile device 120; and (iii) transmits the at least one application identifier to mobile device 120, as illustrated with reference numeral 151 in FIG. 1.

According to another embodiment of the present invention, mobile control unit 122 is operationally adapted to provide a conduit such that application center 100 to determine the zero or more allotted application identifiers 103, and the zero or more application identifiers 104 of applications loaded on mobile device 120 issues an application management request to card device 121 via mobile control processing unit 122, essentially without further processing by that processing unit. Mobile control unit 122 is adapted to issue a device identification request 124 at a time prior to application center 100 issuing application management request 123. Specifically, mobile control unit 122 issues device identification request 124 to card device 121 at boot time or whenever mobile control unit 122 is operationally re-initialized (reset). Application center 100 after issuing application management request 123; (i) receives, in response, the effective mobile device identifier 155 including the assigned mobile device identifier 152; (ii) determines the zero or more allotted application identifiers 103, and the zero or more application identifiers 104 of applications loaded on mobile device 120 based at least in part on received effective mobile device identifier 155; (iii) identifies at least one application identifier of the zero or more allotted application identifiers 103 that does not form part of the zero or more application identifiers 104 of applications loaded on mobile device 120; and (iv) transmits the at least one application identifier to mobile device 120, as illustrated by reference numeral 151 of FIG. 1.

According to another embodiment of the present invention, card device 121 is adapted to request the assigned mobile device identifier from mobile device and send the effective mobile device identifier including the assigned mobile device identifier to the application management center. Upon receipt of the effective mobile device identifier 155, application center 100: (i) determines the zero or more allotted application identifiers 103, and the zero or more application identifiers 104 of applications loaded on mobile device 120 based at least in part on the received effective mobile device identifier 155; (ii) identifies at least one application identifier of the zero or more allotted application identifiers 103 that does not form part of the zero or more application identifiers 104 of applications loaded on mobile device 120; and (iii) transmits the at least one application identifier to mobile device 120, as illustrated with reference numeral 151 in FIG. 1.

According to one embodiment of the present invention, card device 121 includes an assigned card device identifier 135. Assigned card device identifier 135 may be persistently stored in card device 121 memory and assigned to card device 121 when the card device 121 is initialized, e.g. at card device 121 issuance. Specifically, the assigned card device identifier is assigned to card device 121 when application request unit 126 is initialized, and this card device identifier 135 may be different from similarly functional data elements additionally stored in card device 121 as may be associated with other functional units that may also be present in the card device 121 (data elements and functional units not shown in FIG. 1). Furthermore, application request unit 126 is adapted to respond to application management request 123 with an effective mobile device identifier 155 that is based at least in part on the result of a process performed by card device 121. Application center 100, after receiving the effective mobile device identifier 155: (i) determines the zero or more allotted application identifiers 103, and the zero or more application identifiers 104 of applications loaded on mobile device 120 based at least in part on the effective mobile device identifier 155; (ii) identifies at least one application identifier of the zero or more allotted application identifiers 103 that does not form part of the zero or more application identifiers 104 of applications loaded on mobile device; and (iii) transmits the at least one application identifier to mobile device 120, as illustrated with reference numeral 151 in FIG. 1. In a further embodiment, application request unit 126 is operationally adapted to persistently store a mobile device identifier 162 as may be received in a device identification request 124, and include in the response to an application management request 123 an indication that a recently received mobile device identifier 160 differs from a previously stored one 162.

According to one embodiment of the present invention, the effective mobile device identifier is based on the result of a process or protocol initiated by card device 121. According to one embodiment of the present invention, effective mobile device identifier 155 includes assigned mobile device identifier 152. According to another embodiment, card device 121 establishes a mapping between assigned mobile device identifier 130 and effective mobile device identifier 155. According to another embodiment of the present invention, effective mobile device identifier 155 is based at least in part on assigned mobile device identifier 130, assigned card device identifier 135, or both. By way of example, effective mobile device identifier 155 may include one or more cryptograms based at least in part on the result of applying a cryptographic process to one or more of assigned mobile device identifier 130 and assigned card device identifier 135. The one or more cryptograms may be computed using symmetric or asymmetric keys. As a further example, effective mobile device identifier 155 may be based at least in part on the hash value of one or more of assigned mobile device identifier 130 and assigned card device identifier 135. According to another embodiment of the present invention, effective mobile device identifier 155 is transmitted .over a secure transmission path as may have been established by a transmission path protection unit present in card device 121 and in application management center 100 (units not shown in FIG. 1).

Receipt by the application center 100 of effective mobile device identifier 155, whether effective mobile device identifier 155 includes an assigned mobile device identifier 152 or both an assigned mobile device identifier 152 and an assigned card device identifier 154 triggers: (i) a determination of the zero or more allotted application identifiers 103, and the zero or more application identifiers 104 of applications loaded on mobile device 120 at the application center 100; (ii) the identification of the at least one application identifier of the zero or more allotted application identifiers 103, which does not form part of the zero or more application identifiers 104 of applications loaded on mobile device 120; and (iii) a transmission of this at least one application identifier to mobile device 120.

According to another embodiment of the present invention, application request unit 126 generates and transmits a specific request to the application center 100, requesting the above operations of determining the at least one application identifier and transmission of the at least one application identifier to mobile device 120. If card device 121 is responsible for establishing a mapping between an assigned mobile device identifier 130 and an effective mobile device identifier 155, application request unit 126 may include in this request an indication that a persistently stored mobile device identifier 162 differs from a recently received mobile device identifier 160. If the mapping between assigned mobile device identifier 130 and an effective mobile device identifier 155 is done in application center 100, such as when effective mobile device identifier 155 is based at least in part on assigned mobile device identifier 130, application request unit 126 need not include in the request an indication that a persistently stored mobile device identifier 162 differs from a recently received mobile device identifier 160, since application center 100 makes the determination on its own. Receipt by application center 100 of an indication that mobile device identifier 162 persistently stored by application request unit 126 differs from a recently received mobile device identifier 155 may trigger one or more application management actions, including the erasure of all application identifiers presently loaded in mobile device 120 and loading the zero or more allotted application identifiers 103 associated with mobile device 120.

According to one embodiment of the present invention, the at least one application identifier determined at the application center 100 is transmitted to mobile device 120 as a sequence of coded instructions for installation or execution at mobile device 120, i.e., an application program can be transmitted from the application center 100. Alternatively, application identifier 151 transmitted from application center 100 to mobile device 120 may be constituted by an identifier of the application to be loaded at mobile device 120, and mobile device 120 may use the identifier to obtain the corresponding coded instructions from another source. For example, mobile device 120 obtains the application code from a memory available at mobile device 120, storing one or more applications in compressed form, or may obtain the application code from an external device, e.g. arranged somewhere in a communication network 150.

As shown in FIG. 1, application manager 101 receives effective mobile device identifier 155 for use in determining the zero or more allotted application identifiers 103. Effective mobile device identifier 155 may include an assigned mobile device identifier 152. Effective mobile device identifier 155 may also include information indicating the type of mobile device 120, the features of mobile device 120, the capabilities of mobile device 120, or a combination thereof. Alternatively, application center 100 may include a mapping between one or more effective mobile device identifiers and information indicating the type of mobile device 120, the features of mobile device 120, the capabilities of mobile device 120, or a combination thereof. This information may be established once upon a card device detecting a new mobile device. Accordingly, application center 100 may specifically tailor the zero or more allotted application identifiers 103 based at least in part on the features or capabilities of mobile device 120.

Likewise, if application manager 101 also receives assigned card device identifier 154 from card device 121, e.g. as part of effective mobile device identifier 155, application manager 101 may identify a type of card device 121 based at least in part on assigned card device identifier 154, and determine at least part of the zero or more allotted application identifiers 103 based at least in part on the type of card device 121. Accordingly, the zero or more allotted application identifiers 103 may also be specifically tailored to the type of card device 121. By way of example, the zero or more allotted application identifiers 103 may be tailored based at least in part on the features or capabilities of card device 121.

Accordingly, application center 100 is able to determine application identifiers for loading to mobile control unit 122, or for loading to card device 121.

According to one embodiment of the present invention, application manager 101 determines the zero or more allotted application identifiers 103 based at least in part on a location indicator of mobile device 120. Accordingly, the zero or more allotted application identifiers 103 can include a localized set of application identifiers, e.g. providing location dependent application identifiers or features thereof. Furthermore, application manager 101 may determine the zero or more allotted application identifiers 103 based at least in part on an identifier of a serving network 150, enabling provision of zero or more allotted application identifiers 103 based at least in part on a type or features of serving network 150, or based at least in part on an application selection desired by an operator of serving network 150. Additionally, application manager 101, according to another embodiment of the present invention, determines the zero or more allotted application identifiers 103 based at least in part on user subscription information. The user subscription information may include a user subscription of services and associated application identifiers, a user subscription to specific features of services, or both. By way of example, application manager 101 may determine the zero or more allotted application identifiers 103 based at least in part on user preference, including user settings of mobile device 120, user settings pertaining to service selection, and other user preferences.

According to one embodiment of the present invention, application center 100 determines the zero or more application identifiers 104 of applications loaded on mobile device 120 based at least in part on information regarding application identifiers previously loaded on mobile device 120, e.g. maintained at the application center 100. Alternatively or addition thereto, application manager 101 can request from mobile device 120 information regarding identifiers of applications loaded on mobile device 120, card device 121, or both.

Additionally, according to one embodiment of the present invention, card device 121 transmits information regarding identifiers of applications loaded on mobile device 120 in association with effective mobile device identifier 155.

Application center 100 may also request information from mobile device 120 regarding identifiers of applications loaded on mobile device 120 upon detecting the absence of one or more application identifiers 104 loaded on mobile device 120 at the application center 100, a lapse of a predetermined period of time, or both. Accordingly, application center 100 is made aware of the application identifiers presently loaded on mobile device 120.

As an alternative to card device 121 detecting a new mobile device 120, the application manager 101 may store corresponding (assigned card device identifier 135, assigned mobile device identifier 152) pairs received from mobile device 120, and the application manager 101 receives a new assigned card device identifier 154 or assigned mobile device identifier 152 in association with a previously stored assigned mobile device identifier 152 or card device identifier 154 of a corresponding pair, mobile device 120 may be requested to provide information regarding identifiers of applications loaded on mobile device 120. Thus, if a card device 121 is exchanged, or inserted into a new mobile device 120, zero or more application identifiers of applications loaded on mobile device 120 may automatically be determined.

As noted above, the application identifiers may be provided for installation on card device 121, for installation on mobile control unit 122 of mobile device 120, or for both. Therefore, according to one embodiment of the present invention, the zero or more allotted application identifiers 103 includes zero or more allotted mobile application identifiers and zero or more allotted card application identifiers. Similarly, in this case the zero or more identifiers 104 of applications loaded on mobile device 120 includes zero or more mobile applications for loading on mobile control unit 122 of mobile device 120, and zero or more card applications for loaded on the card device 121.

In the following, examples of application center 100 and mobile device 120 are described in further detail. The following constitutes examples only and should not be construed as limiting the application.

Application center 100 is responsible for maintaining or obtaining information regarding allotted application identifiers of a mobile device 120, and zero or more application identifiers of applications loaded on mobile device 120. Further, application center 100 is responsible for selecting at least one of the application identifiers of the zero or more allotted application identifiers 103 which are not already loaded on mobile device 120, i.e., which do not form part of the zero or more application identifiers 104 loaded on mobile device 120.

The application center 100 may manage a plurality of mobile devices, e.g. subscribers of a particular network 150 or subscribers to the application loading service of application center 100. According to one embodiment of the present invention, application center 100 is located on a network side of a network 150 serving mobile device 120 or mobile devices and forms an integral part of a serving network 150, responsible for all mobile devices having subscribed to network 150, or mobile devices being present in mobile network 150. According to another embodiment of the present invention, application center 100 is responsible for only part of a communication network 150. According to another embodiment of the present invention, application center 100 is responsible for a number of different communication networks such as network 150.

Furthermore, while application center 100 shown in FIG. 1 is formed by a single unit, as shown in FIG. 1, it is also possible that application center 100 includes distributed elements, for example distributed over a network 150, e.g. in a backbone of a communication network 150.

According to one embodiment of the present invention, application center 100 maintains centralized information regarding zero or more allotted application identifiers 103 and zero or more identifiers 104 of applications loaded on the mobile device for each one of a number of mobile devices. According to one embodiment of the present invention, elements of application center 100 are distributed, and there is one master copy of zero or more allotted application identifiers 103 and zero or more application identifiers 104 of applications loaded on mobile device 120. However, it is possible that in a larger network environment, copies of the master zero or more allotted application identifiers 103 and master zero or more application identifiers 104 of applications loaded on mobile device 120 are taken and distributed over network 150, with the copies being maintained in closer proximity to an actual location of mobile device 120. For example, in a GSM system a master copy of the zero or more allotted application identifiers 103 and zero or more application identifiers 104 of applications loaded on mobile device 120 may be stored in a database of the GSM network, whereas copies of the zero or more allotted application identifiers 103 and zero or more application identifiers 104 of applications loaded on mobile device 120 may for example be maintained at a mobile switching center (MSC).

According to one embodiment of the present invention, the zero or more allotted application identifiers 103 shown in FIG. 1 indicates all application identifiers allotted to a particular mobile device 120, card device 121, or both. While it is possible that the zero or more allotted application identifiers 103 include program code for each application or, e.g. a source code or a compiled code, it is also possible that the zero or more allotted application identifiers 103 only includes identifiers of the respective application, with the program code pertaining to the application being stored at another location and being referenced through the identifier of the application. Furthermore, the zero or more allotted application identifiers 103 may be stored as one unit for example in a memory of application center 100, or portions of the zero or more allotted application identifiers 103 may be stored in a distributed fashion in different memories of application center 100. In one example, the group of application identifiers pertaining to card device 121 are stored at one location, and the group of application identifiers pertaining to mobile device 120, i.e., mobile control unit 122, are stored at another location in application center 100.

According to one embodiment of the present invention, the zero or more application identifiers 104 of applications loaded on mobile device 120, similar to the zero or more allotted application identifiers 103, are stored at a central location, or in a distributed fashion, with parts or copies of the zero or more application identifiers 104 of applications loaded on mobile device 120 being stored in closer proximity to mobile device 120 and includes zero or more application identifiers of applications, which are already loaded to mobile device 120, i.e. card device 121 or mobile control unit 122.

While it is possible that the zero or more allotted application identifiers 103, and the zero or more application identifiers 104 of applications loaded on mobile device 120 are physically stored somewhere at application center 100, according to another embodiment of the present invention, the zero or more allotted application identifiers 103, the zero or more application identifiers 104 of applications loaded on mobile device 120, or both, are generated on the fly, e.g. upon detecting a command or request pertaining to loading an application identifier to mobile device 120.

The applications for mobile device 120, i.e. for mobile control unit 122 and card device 121, may be of any type, including any kind of service application or application for an operating system of mobile control unit 122, card device 121, or both. Thus, an application could provide certain functionality for mobile device 120, such as to obtain or utilize a certain service provided through mobile device 120. By way of example, an application may relate to e-mail services, to a maintenance program of personal data, such as addresses and the like, to a banking application for enabling online banking, to information services, such as news services, local traffic information, information regarding local events, and the like. Additionally, an application may pertain to an operating system of mobile device 120, i.e. controlling mobile control unit 122, card device 121, or both. These applications may add certain basic functionality to mobile device 120, such as the capability to securely transmit data, the ability to utilize certain compression techniques, applications enabling the use of application programs, and others.

As detailed above, application manager 101 of application center 100 is responsible for determining the zero or more allotted application identifiers 103, and the zero or more application identifiers 104 of applications loaded on mobile device 120 based at least in part on assigned mobile device identifier 152, assigned card device identifier 154, or both, and to identify at least one application identifier of the zero or more allotted application identifiers 103, which does not form part of the zero or more application identifiers 104 of applications loaded on mobile device 120.

Application loader 102 of application center 100 is responsible for loading the at least one determined application identifier to mobile device 120.

According to one embodiment of the present invention, application manager 101 and application loader 102, i.e., the functionality realized by application manager 101 and application loader 102 is implemented by executing code instructions of corresponding programs on a data processing device. Application manager 101 and application loader 102 may thus be realized by loading corresponding executable code sections from a memory into a processor and executing the executable code sections. Furthermore, while it is possible that application manager 101 and application loader 102 may be implemented by the same processing device, it is also possible that a group of processing devices, co-located or remotely located from one another, implement application manager 101 and application loader 102. Alternatively, application manager 101, application loader 102, or both, may be at least partially realized by hardware elements.

According to one embodiment of the present invention, application manager 101 enters communications with mobile device 120, network 150, e.g., a serving communication network, or both, to determine the location of mobile device 120, information regarding network 150 such as an identifier, characteristics of network 150, or both, subscription information of a user, one or more user preferences, and a type of mobile device 120 and card device 121. Application loader 102 can obtain this information by accessing corresponding registries of network 150, registering a location of mobile device 120, an identifier of network 150, user subscription information, and one or more user preferences. Alternatively, or in addition thereto, application manager 101 transmits corresponding requests to network 150, mobile device 120, or both, to obtain the above information.

Mobile device 120 of FIG. 1 is shown as a mobile telephone, but may instead also be any other kind of mobile communication device. For example, mobile device 120 may be a mobile computing device, such as a laptop computer, a personal digital assistant (PDA), or the like.

Mobile device 120 is able to enter a one- or bi-directional communication with a network 150 and application center 100, and may operate in accordance with any standard, such as according to the GSM (Global System for Mobile Communications) standard, the UMTS (Universal Mobile Telecommunications System) standard, also known as wide band CDMA (WCDMA), the CDMA2000 (Code Division Multiple Access 2000) standard, or may operate according to a wireless LAN standard, 3G (third generation) or beyond 3G networks, or any standard for wireless communication with distributed medium access control. Mobile device 120 may also be capable of implementing a plurality of standards or access technologies and thus may be able to connect to wireless communication networks operating in accordance with different standards.

As shown in FIG. 1, mobile device 120 maintains a communication link, such as an RF connection, to network 150. This communication link is for use by voice or data services and for communicating with application center 100. However, it is also possible that mobile device 120 maintains more than one communication link to support communications with network 150 on the one hand and for communicating with application center 100 on the other hand.

Communications carried out by or using mobile device 120 may involve voice communications, data communications, or both, e.g. in a regular telephone call or in a data communication between two parties.

Network 150 may include any kind of wireless communication network 150 operating according to any communication standard or combinations thereof, such as the GSM (Global System for Mobile Communications) standard, the UMTS (Universal Mobile Telecommunications System) standard, also known as wide band CDMA (WCDMA), the CDMA2000 (Code Division Multiple Access 2000) standard, wireless LAN standard, 3G (third generation) or beyond 3G networks, as noted above.

According to one embodiment of the present invention, mobile control unit 122 at mobile device 120 includes a processing unit and a memory for storing data, coded instructions pertaining to applications, or both. Mobile control unit 122 is responsible for communicating with card device 121, and is responsible for operating mobile device 120, i.e., to provide the functions of mobile device 120, and integrates an operating system of mobile device 120. Furthermore, mobile control unit 122 is capable of receiving one or more application identifiers from application center 100 and installing the one or more application identifiers, e.g. in a memory of mobile control unit 122. The functionality of mobile control unit 122 may be realized by coded instructions stored in a memory of mobile control unit 122 and loaded into a processing unit of mobile control unit 122. Alternatively or in addition thereto, at least part of mobile control unit 122 may be realized in hardware.

Card device 121 is a card embedded with a computer chip for performing processing operations and for storing data, or any other kind of card device 121 having provided thereon a memory and a processing unit. According to one embodiment of the present invention, card device 121 includes a processing unit and a memory. The memory stores coded instructions of programs for realizing identification unit 125 and coded instructions of a program or programs for realizing application request unit 126. These instructions can then be loaded into the processing unit, enabling card device 121 to execute the functionality of identification unit 125 and application request unit 126.

Card device 121 may be constituted by any card device for mobile devices, such as a SIM (subscriber identification module), a UICC, or a smart card ,or other kind of chip card. Card device 121 is a card insertable into a dedicated slot or compartment of mobile device 120 and connects to terminals of mobile device 120.

According to one embodiment of the present invention, card device 121 includes a secure portable device such as a Java Card™ technology-enabled device, or the like. Java Card™ technology is described in Chen, Z. Java Card™ Technology for Smart Cards—Architecture and Programmer's Guide, Boston, Addison-Wesley, 2000.

According to one embodiment of the present invention, card device 121 includes a CDMA technology-enabled smart card. CDMA technology-enabled smart cards are described in Smart Card Stage I Description, Version 1.1, CDMA Development Group—Smart Card Team Document (May 22, 1996).

According to another embodiment of the present invention, card device 121 includes a SIM (Subscriber Identity Module card) card. The term "SIM card" describes the smart card used in GSM (Global System for Mobile Communications) mobile telephones. The SIM includes the subscriber's personal cryptographic identity key and other information such as the current location of the phone and an address book of frequently called numbers. The SIM is described in Digital cellular telecommunications system (phase 2+); Specification of the Subscriber Identity Module—Mobile Equipment (SIM—ME) interface, ETSI, GSM 11.11 version 7.4.0, Release 1998.

According to another embodiment of the present invention, card device 121 includes a WIM (Wireless Interface Module). A WIM is a smart card in a WAP (Wireless Application Protocol) phone. It is described in Wireless Identity Module Part: Security, WAP-260-WIM-20010712-a, Wireless Application Protocol Forum, Jul. 12, 2001. According to another embodiment of the present invention, card device 121 includes a USIM (Universal Subscriber Identity Module). A USIM is a smart card application resident on a UICC platform and defined by the 3rd Generation Partnership Project (3GPP). A USIM is described in the USIM specification, "Characteristics of the Universal Subscriber Identity Module (USIM) application," 3GPP TS 31.102, and the other 31 series of documents from 3GPP, and so is known to those of skill in the art.

According to another embodiment of the present invention, card device 121 includes a UIM (User Identity Module). A UIM is a smart card for a 3GPP Project 2 (3GPP2) mobile phone. The term "R-UIM" is used when the smart card is removable. A UIM is a super set of the SIM and allows CDMA (Code Division Multiple Access)-based cellular subscribers to roam across geographic and device boundaries.

The R-UIM is described in a specification issued by the 3rd Generation Partnership Project 2 (3GPP2) and entitled 3rd Generation Partnership Project 2; Removable User Identity Module (R-UIM) for CDMA2000 Spread Spectrum Systems, 3GPP2 C.S0023-0, Jun. 9, 2000.

The above description regarding various mobile phone technologies is not intended to be limiting in any way. Those of ordinary skill in the art recognize that other mobile devices may be used.

An operator of application center 100 or network 150 operator may own card device 121, so that card device 121 and application center 100 are under control of the same entity.

According to one embodiment of the present invention, mobile device 120 and card device 121 or, alternatively, application request unit 126 are uniquely identifiable by identification codes, for example, mobile device 120, more precisely mobile control unit 122 can be identified by an IMEISV (International Mobile Equipment Identity Software Version). Card device 121 can be identified by a card serial number and the application request unit by an AID (Application Identifier) in conjunction with an assigned applet identifier. According to one embodiment of the present invention, the effective mobile device identifier 155 or assigned card device identifier 154 is an IMEI (International Mobile Equipment Identifier), where effective mobile device identifier 155 or assigned card device identifier 154 has a value that differs from the value of assigned mobile device identifier 130, effectively mimicking the assigned card device identifier as a mobile device identifier in IMEI form and obviating the need to transmit assigned mobile device identifier 130.

According to one embodiment of the present invention, card device 121 reacts upon switching on mobile device 120 and then downloads data containing information such as characteristics or capabilities of mobile device 120. According to another embodiment of the present invention, mobile device 120 carries out a boot process upon being switched on, part of this boot process being a reset operation of card device 121. Zero or more initial information is then downloaded to card device 121. The initial information may include assigned mobile device identifier 130 and information regarding characteristics or capabilities of mobile device 120. If assigned mobile device identifier 130 or information regarding characteristics or capabilities of mobile device 120 is not included in the zero or more initial information, card device 121 actively requests the missing information. The information is then provided to application center 100 to facilitate determining the zero or more allotted application identifiers 103.

Additionally, a processing unit of card device 121 may compare the value of a recently received or transient mobile device identifier 160 of mobile device 120 with a previously stored or persistent mobile device identifier 162 to determine whether card device 121 was inserted into another mobile device. In case card device 121 was inserted into another mobile device, the download operations of application identifiers may be triggered, i.e., effective mobile device identifier 155 may be transmitted to application center 100 and loading of application identifiers may be requested.

Card device 121 may use existing messages of a transport protocol to network 150, application center 100, or both, to send the identifiers to application center 100, thus requiring only minor changes to an existing communication protocol.

Figure 2:
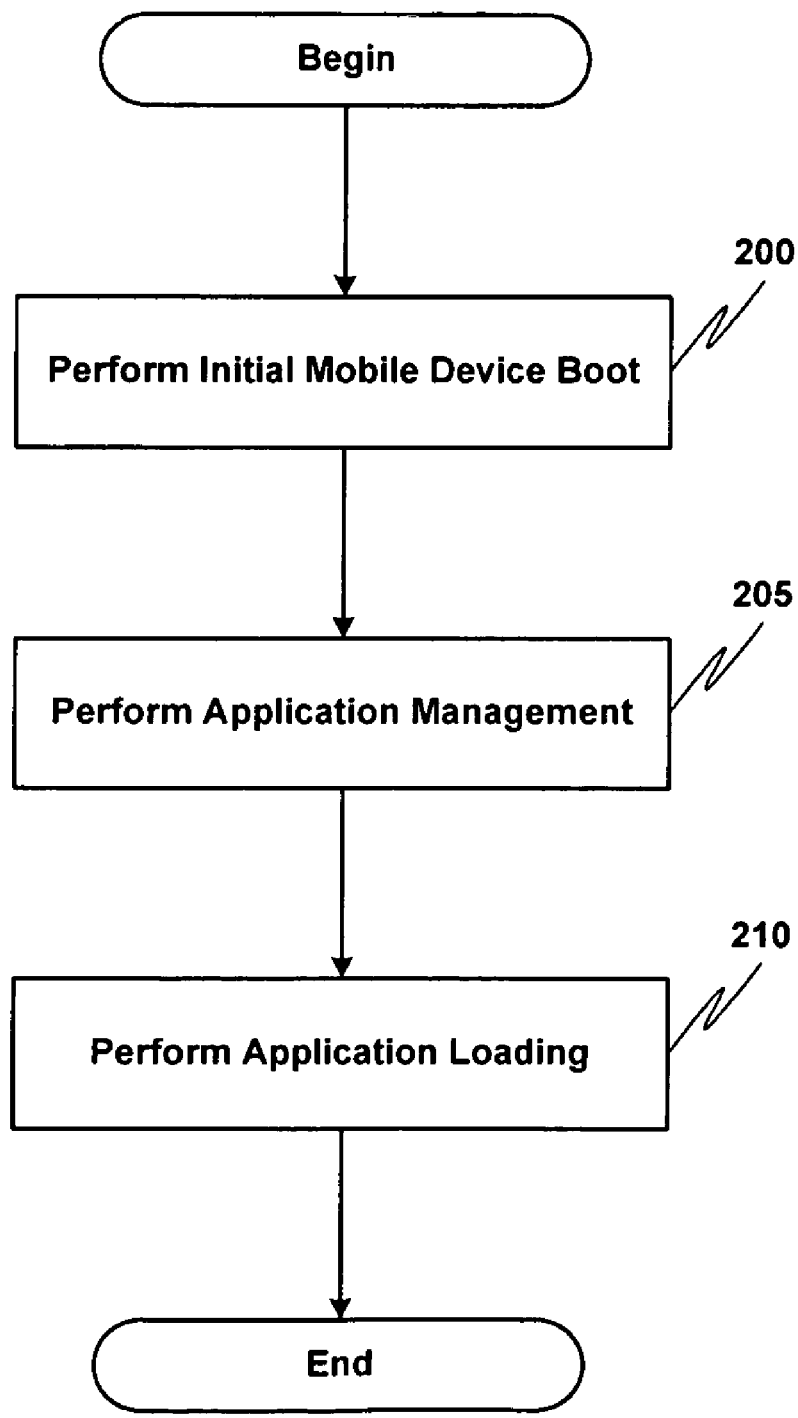
FIG. 2 is a high level flow diagram that illustrates a method for loading one or more application identifiers to a mobile device from a system perspective in accordance with one embodiment of the present invention.
Figure 3:
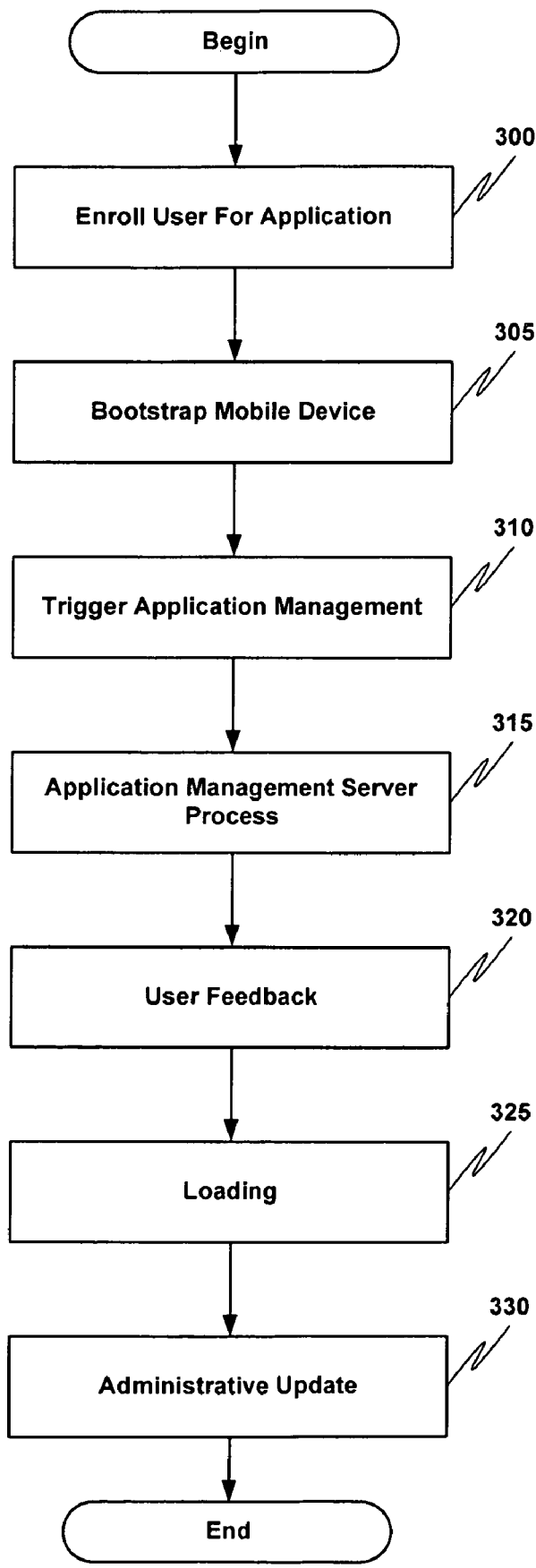
FIG. 3 is a low level flow diagram that illustrates a method for loading one or more application identifiers to a mobile device from a system perspective in accordance with one embodiment of the present invention.
Figure 4:
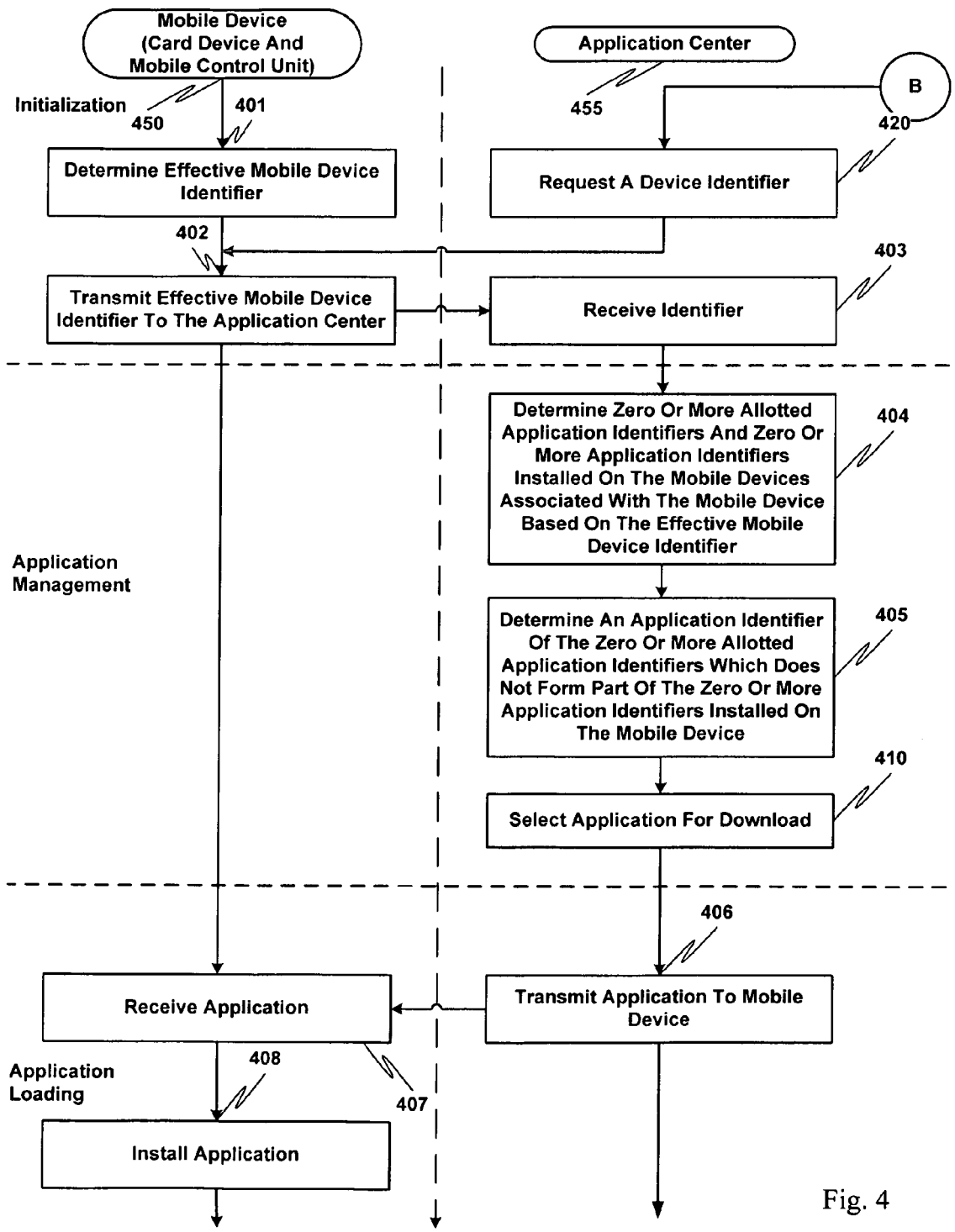
FIG. 4 is a flow diagram that illustrates initialization, application management, and application loading methods from the perspectives of a mobile device and an application center in accordance with embodiments of the present invention.
Figure 5:
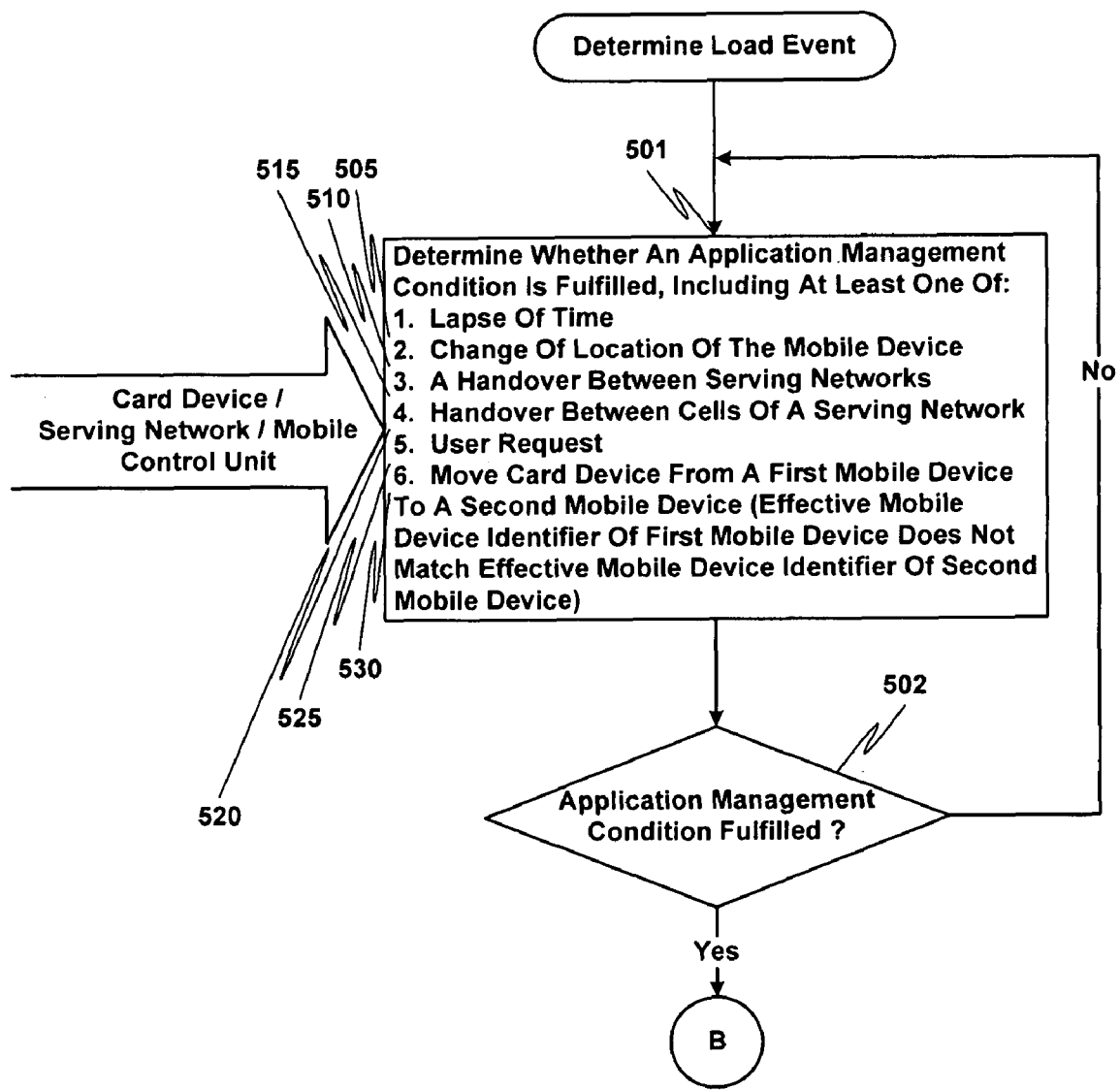
FIG. 5 is a flow diagram that illustrates a method for determining a load event in accordance with one embodiment of the present invention.
Figure 6:
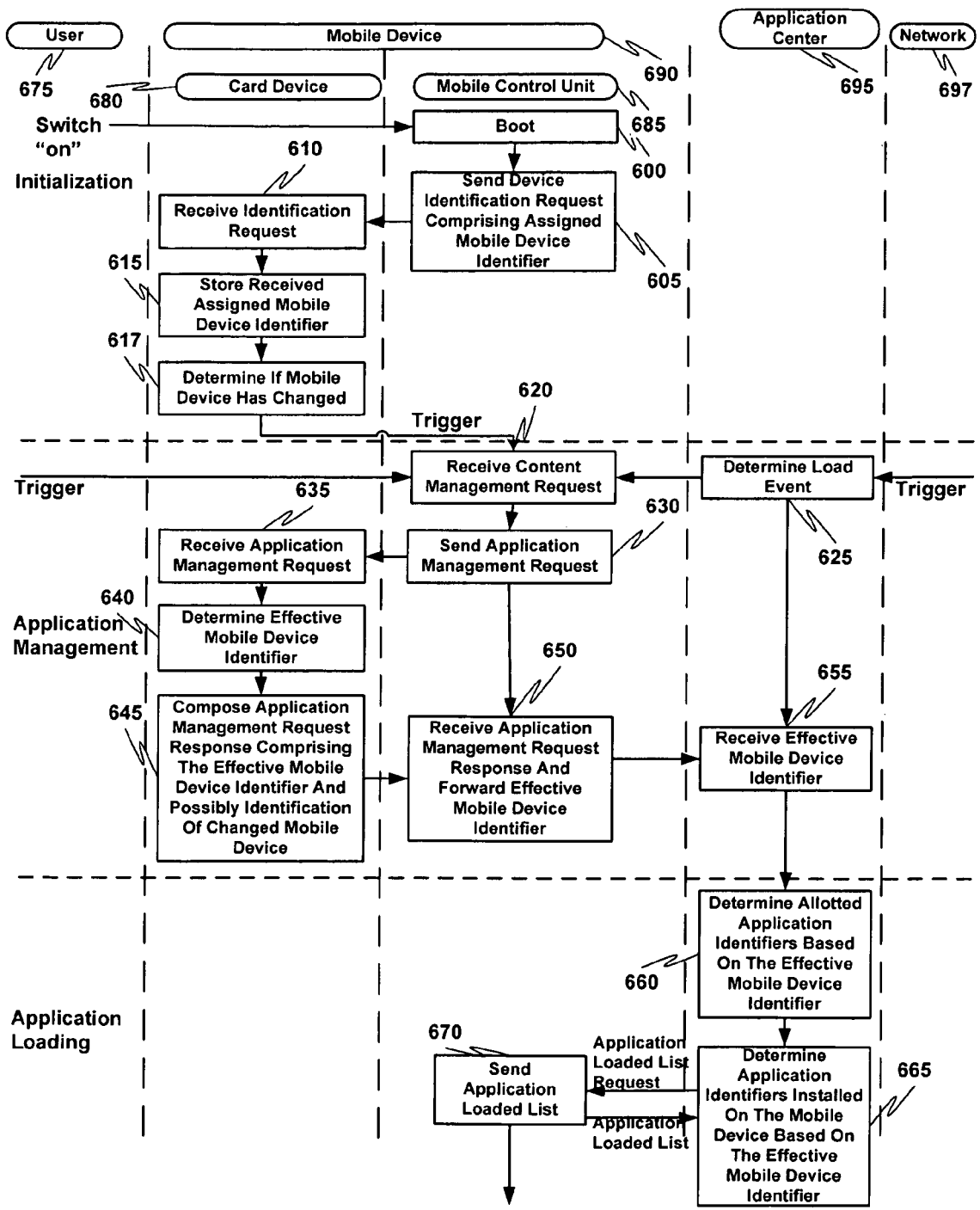
FIG. 6 is a flow diagram that illustrates initialization, application management, and application loading methods from the perspectives of a user, a card device of a mobile device, a mobile control unit of the mobile device, an application center, and a network in accordance with embodiments of the present invention.
Figure 7:
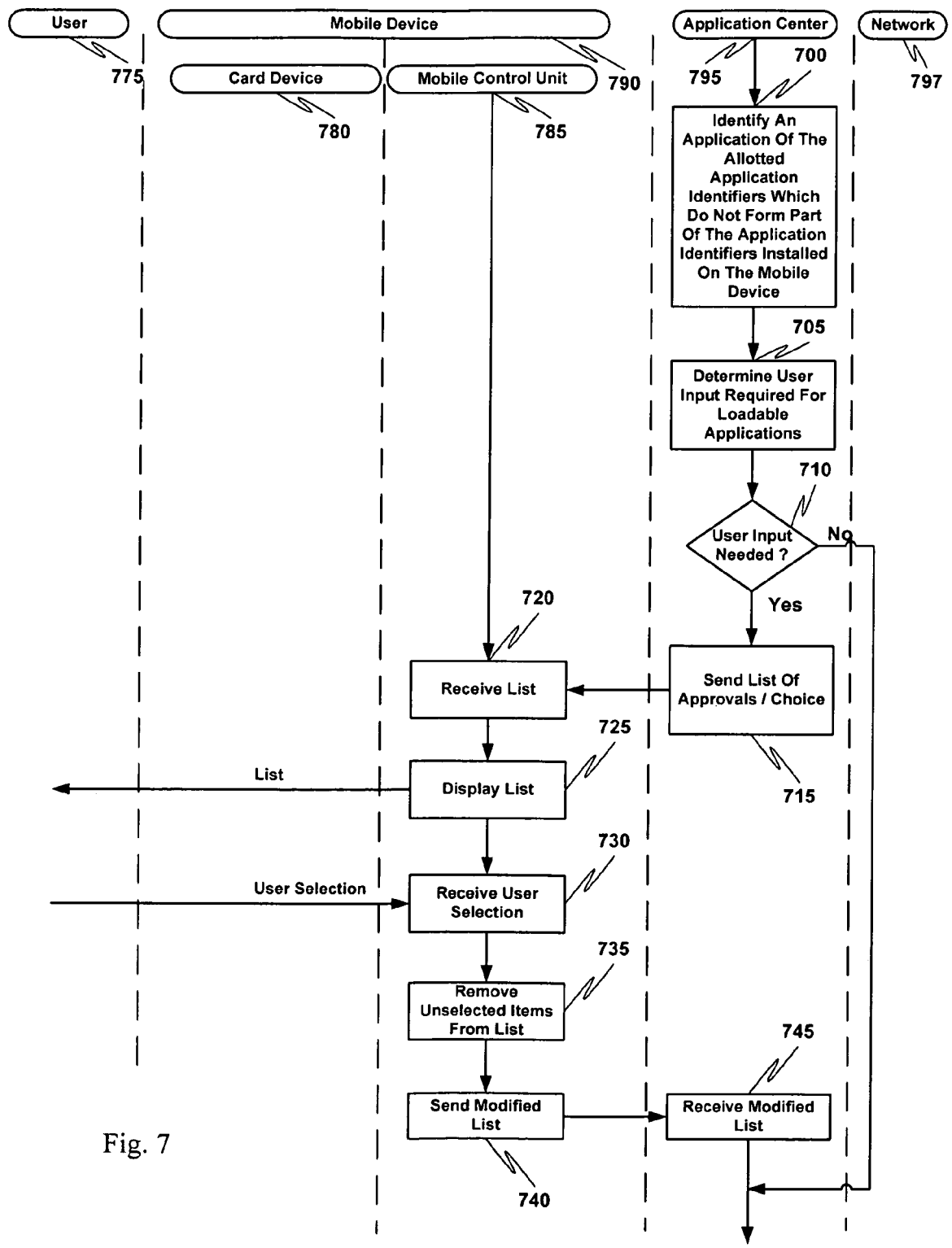
FIG. 7 is a flow diagram that illustrates application identifier loading methods from the perspectives of a user, a card device of a mobile device, a mobile control unit of the mobile device, an application center, and a network, with particular emphasis on user input regarding loadable applications in accordance with embodiments of the present invention.
Figure 8:
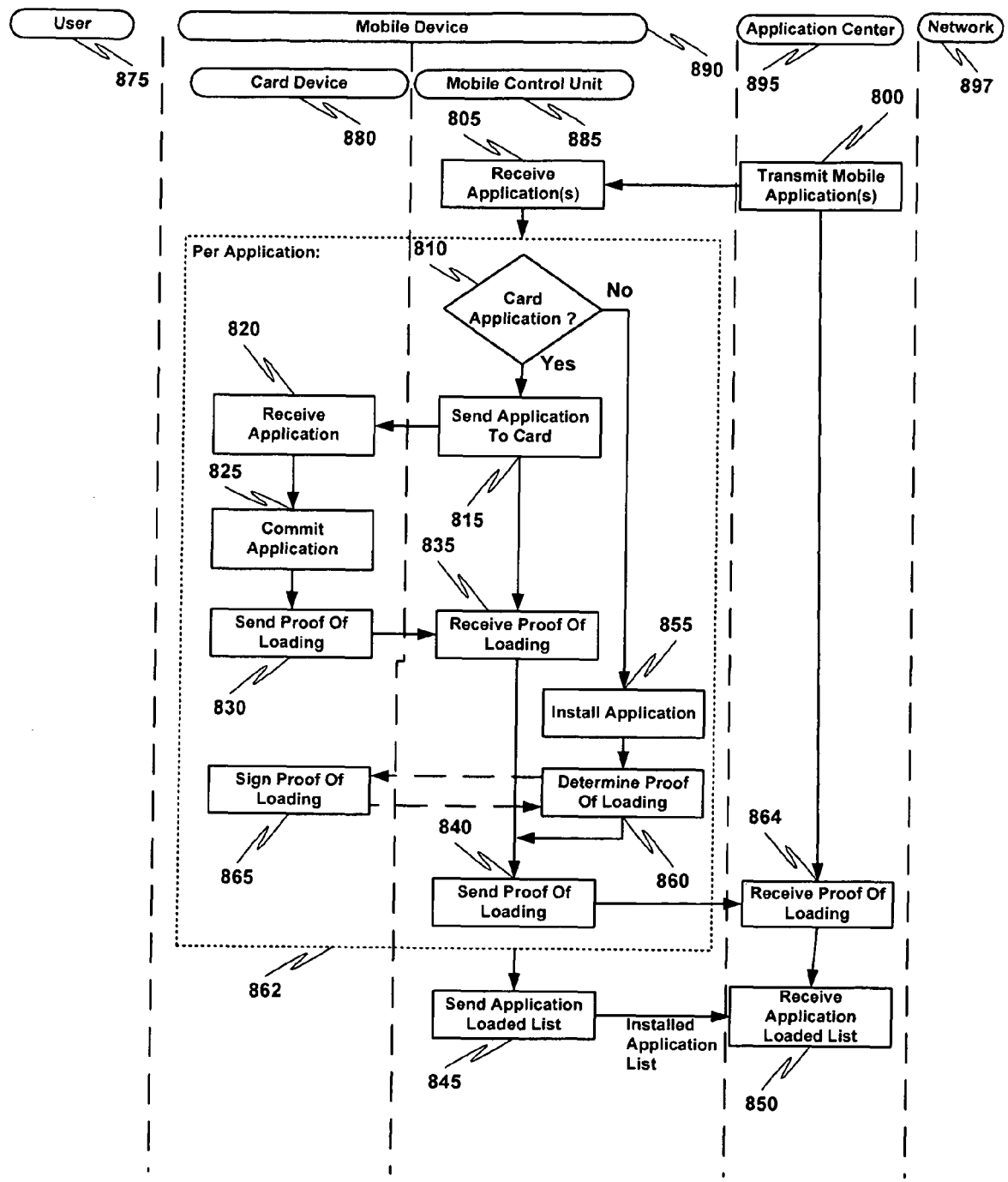
FIG. 8 is a flow diagram that illustrates application identifier loading methods from the perspectives of a user, a card device of a mobile device, a mobile control unit of the mobile device, an application center, and a network, with particular emphasis on providing a proof of loading in accordance with embodiments of the present invention.
Figure 9:
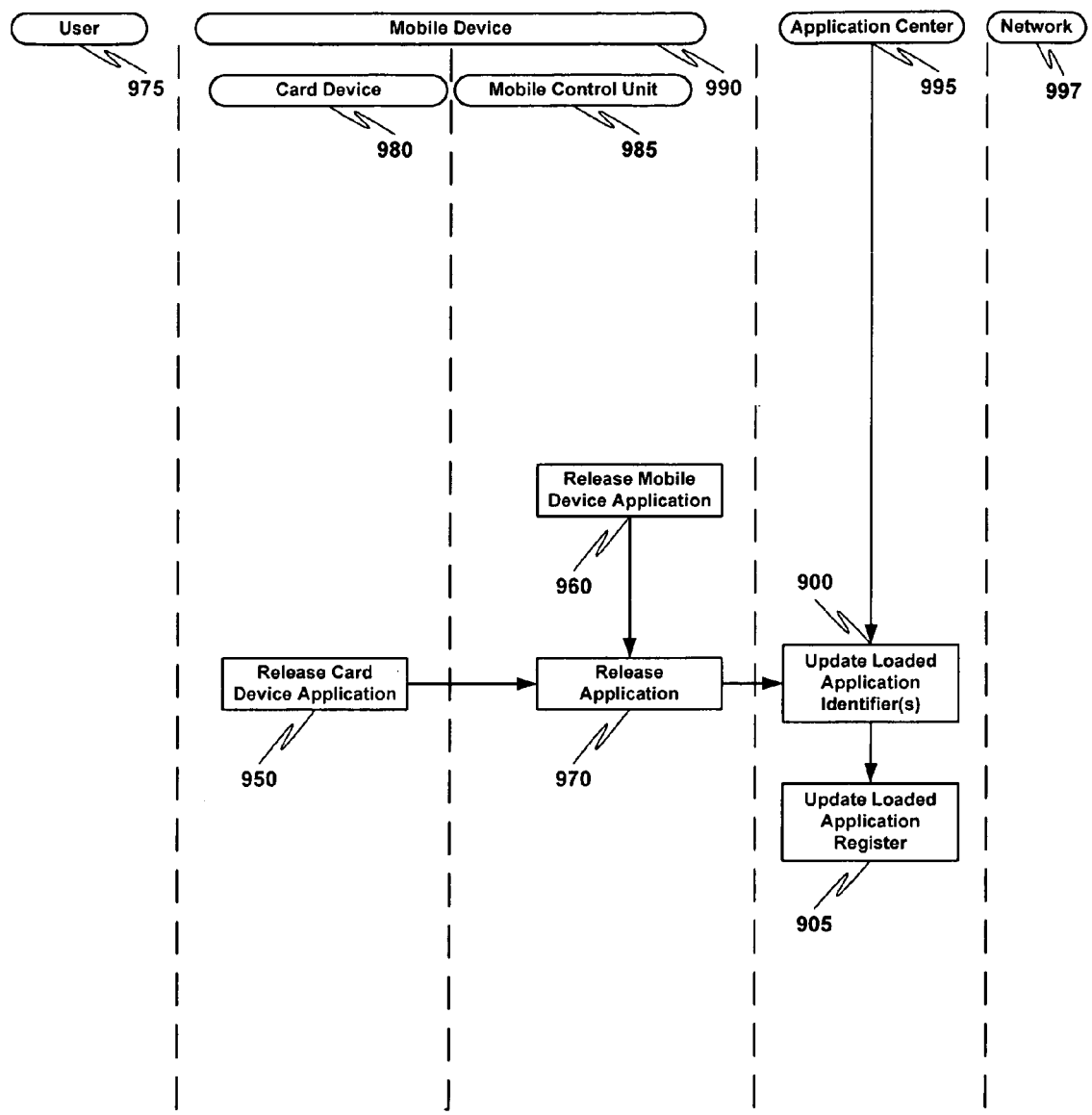
FIG. 9 is a flow diagram that illustrates application identifier releasing methods from the perspectives of a user, a card device of a mobile device, a mobile control unit of the mobile device, an application center, and a network, with particular emphasis on performing administrative updates in accordance with embodiments of the present invention.

FIGS. 2-8 illustrate loading one or more application identifiers to a mobile device in accordance with embodiments of the present invention. FIG. 2 provides a high level overview of the processes from a system perspective, while FIG. 3 provides a low level illustration of the processes from a system perspective. FIGS. 4 and 5 illustrate initialization, application management, and application loading from the perspectives of a mobile device and an application center. FIGS. 6-8 illustrate initialization, application management, and application loading from the perspectives of a user, a card device of a mobile device, a mobile control unit of the mobile device, an application center, and a network. FIG. 9 illustrates application identifier releasing methods from the perspectives of a user, a card device of a mobile device, a mobile control unit of the mobile device, an application center, and a network. The operations of FIGS. 2-9 may be carried out using the communication environment shown in FIG. 1, however, FIGS. 2-9 are not limited thereto.

Turning now to FIG. 2, a high level flow diagram that illustrates a method for loading one or more application identifiers to a mobile device from a system perspective in accordance with one embodiment of the present invention is presented. The processes illustrated in FIG. 2 may be implemented in hardware, software, firmware, or a combination thereof. In operation 200, the mobile device is booted upon being switched "on". During the boot process of the mobile device, the mobile control unit of the mobile device may also initialize the card device inserted into the mobile device such as card device 121 shown in FIG. 1. In operation 205, application management operations are performed, producing an indication of zero or more application identifiers to be loaded to the mobile device. The application management operations may be triggered by the occurrence of one or more events, including the passage of a predetermined amount of time. In operation 210, the zero or more application identifiers determined in operation 205 are loaded to the mobile device. The zero or more application identifiers may be loaded with or without user input regarding whether one application identifiers allotted to but not loaded on a mobile device should be loaded to the mobile device.

Turning now to FIG. 3, a low level flow diagram that illustrates a method for loading one or more application identifiers to a mobile device from a system perspective in accordance with one embodiment of the present invention is presented. FIG. 3 provides more detail for FIG. 2. The processes illustrated in FIG. 3 may be implemented in hardware, software, firmware, or a combination thereof. In operation 300, a user is enrolled for one or more applications. The enrollment establishes a relationship between the user and an application management center associated with the one or more applications. By way of example, the user may provide a payment in return for use of a service, which is enabled by an application capable of being downloaded to and executed on the user's mobile device. In operation 305, the mobile control unit of the mobile device performs a boot process. During or after the boot process, the mobile control unit sends an assigned mobile device identifier to the card device. In operation 310, trigger application management is performed. The trigger application management process detects the occurrence of one or more events that trigger an application management server process 315. An exemplary trigger event is detecting that a particular assigned card device identifier is presently associated with a different assigned mobile device identifier, indicating the card has been placed in a different mobile device. Other examples are presented below. Upon occurrence of one of such triggering events, an application management server process 315 is initiated. Application management server process 315 determines which of one or more application identifiers, if any, should be loaded to the mobile device. If there are one or more application identifiers to be loaded to the mobile device, the one or more application identifiers are loaded to the mobile device at load operation

325. Upon completion of the loading process, an administrative update process 330 is performed to indicate the one or more application identifiers currently loaded on the mobile device.

Turning now to FIG. 4, a flow diagram that illustrates initialization, application management, and application loading methods from the perspectives of a mobile device and an application center in accordance with embodiments of the present invention is presented. The processes illustrated in FIG. 4 may be implemented in hardware, software, firmware, or a combination thereof. In operation 401 an effective mobile device identifier is determined. According to one embodiment of the present invention, the effective mobile device identifier also includes an identifier that uniquely identifies a particular card device associated with the mobile device. In operation 402 the effective mobile device identifier is transmitted to application center 455, e.g. to application center 100 shown in FIG. 1. The transmission of the effective mobile device identifier to application center 455 may include any kind of transmission technique, such as any kind of wireless transmission, may include wire-bound transmissions, package-switched transmissions and so on.

According to one embodiment of the present invention, the effective mobile device identifier is determined based upon an assigned mobile device identifier, an assigned card device identifier, or both.

Still referring to FIG. 4, in operation 403, application center 455 receives the effective mobile device identifier. Upon the occurrence of a triggering event, in operation 404, zero or more allotted application identifiers and zero or more application identifiers of applications loaded on mobile device 450 are determined based at least in part on the effective mobile device identifier. For example, application center 455 stores for each effective mobile device identifier zero or more allotted application identifiers and zero or more application identifiers of applications loaded on mobile device 450. The zero or more allotted application identifiers may thus be tailored to an individual mobile device.

Alternatively, or in addition thereto, a first effective mobile device identifier is associated with a first set of mobile devices having a first zero or more allotted application identifiers, and a second effective mobile device identifier is associated with a second set of mobile devices having a second zero or more allotted application identifiers. Membership in one of the sets of mobile devices may be determined based at least in part on mobile device capabilities, mobile device type, mobile device user subscription, or mobile device user preferences. Those of ordinary skill in the art recognize that other membership criteria may be used.

The zero or more allotted application identifiers may be permanently stored at application center 455, or may be determined on demand, e.g. upon receiving an effective mobile device identifier. In the first case, application center 455, using the effective mobile device identifier, simply identifies a memory section, in an application store of application center 455, holding the zero or more allotted application identifiers. The same cases apply to the zero or more application identifiers of applications loaded on mobile device 450. In the alternative, the zero or more allotted application identifiers are determined upon receiving the effective mobile device identifier, e.g. based at least in part on certain rules, such as a location of mobile device 450, an identity of a user of mobile device 450, a network, or other criteria.

As noted before, the zero or more allotted application identifiers may include coded instructions corresponding to the application identifiers, or may include identifiers of the applications, which can later be used to retrieve coded instructions corresponding to the application identifier from another location.

Similarly, the zero or more application identifiers of applications loaded on mobile device 450 may be permanently stored and updated, i.e., when an application identifier is loaded to mobile device 450, the corresponding application identifier could be included into the zero or more application identifiers of applications loaded on mobile device 450. Alternatively, the zero or more application identifiers of applications loaded on mobile device 450 are determined on demand, e.g. when receiving the effective mobile device identifier. In this case application center 455 may interrogate mobile device 450 to learn about application identifiers loaded on mobile device 450. Alternatively, the information regarding identifiers of applications loaded on mobile device 450 may be transmitted in association with the effective mobile device identifier to application center 455, i.e., at operation 402.

Once the zero or more allotted application identifiers and the zero or more application identifiers of applications loaded on mobile device 450 are identified, in operation 405 an application identifier of the zero or more allotted application identifiers, which does not form part of the zero or more application identifiers of applications loaded on mobile device 450, is determined. In operation 410, an application identifier is selected for loading to mobile device 450. By way of example, if a set comparison of the zero or more allotted application identifiers and the zero or more application identifiers of applications loaded on mobile device 450 yields a set, possibly empty, of application identifiers of the zero or more allotted application identifiers, which do not form part of the zero or more application identifiers of applications loaded on mobile device 450, one or more of the application identifiers, which do not form part of the zero or more application identifiers of applications loaded on mobile device 450, are selected for loading to mobile device 450.

According to one embodiment of the present invention, determining the one or more application identifiers from the zero or more allotted application identifiers, which are not already loaded, includes a selection operation. The selection operation may include applying a randomized selection process to select a predetermined number of application identifiers for loading to mobile device 450, the predetermined number, for example, depending on an available time for loading application identifiers, or an available bandwidth.

According to another embodiment of the present invention, the selection process includes assigning priorities to application identifiers, and loading the application identifiers in the sequence of their priority. By way of example, application identifiers associated with an operating system of mobile device 450, assuring proper functioning of mobile device 450, may be assigned a higher priority. Similarly, application identifiers enabling services requested by a user may be assigned a high priority. By way of example, if a user makes a request that requires a mail service, the mail service may be assigned a high priority with respect to other application identifiers that are not needed for executing the mail service or application identifiers that are not required for proper functioning of mobile device 450.

After identifying the application identifier or application identifiers to be loaded to mobile device 450, the zero or more application identifiers of applications loaded on mobile device 450 can be appropriately updated by including application identifiers, which are or will be loaded to mobile device 450.

Thereafter, in operation 406, the one or more application identifiers are transmitted to mobile device 450. In operation 407, mobile device 450 receives the one or more application identifiers. As noted before, the transmission of the application code or identifier may employ an existing communication link between mobile device 450 and application center 455 or a serving network, or may employ a dedicated communication link. In operation 408, the one or more application identifiers are installed on mobile device 450, e.g. by storing the application code in a memory of mobile device 450, enabling a later loading of the code into a processing device of mobile device 450 for realizing the functionality of the application identifier.

According to one embodiment of the present invention, mobile device 450 returns a completion indicator to application center 455, indicating a successful loading of the application identifier or the application identifiers, to enable application center 455 to appropriately update the zero or more application identifiers of applications loaded on mobile device 450.

Turning now to FIG. 5, a flow diagram that illustrates a method for determining a load event, in accordance with one embodiment of the present invention, is presented. FIG. 5 illustrates events that may trigger performance of the application management server process, such as process 315 of FIG. 3 and processes 404 and 405 of FIG. 4. The processes illustrated in FIG. 5 may be implemented in hardware, software, firmware, or a combination thereof. As shown in operation 501, exemplary triggering events include a determination that a predetermined amount of time has lapsed (505), a determination that the location of the mobile unit has changed (510), a determination that there has been a handover between serving networks (515), a determination that there has been a handover between cells of a serving network (520), a determination of a user request (525), and a determination that a card device has been removed from a first mobile device and inserted into a second mobile device that has an assigned mobile device identifier different from the one assigned to the first mobile device (530). Upon determining an application management condition has been fulfilled, application management process 404 (FIG. 4) is initiated.

In operation 501 a determination is made regarding whether an application management condition is fulfilled. According to one embodiment of the present invention, an application management condition includes the lapse of a predetermined amount of time. Thus, mobile devices may be regularly checked in view of application identifiers loaded. The predetermined period of time could for example be a month, a week or any other period of time.

According to one embodiment of the present invention, an application management condition includes a change of location of the mobile device. For example, if the mobile device changes its location, a localized set of application identifiers may be allotted to the mobile device. The change of location may also trigger loading one or more of the newly allotted applications.

According to one embodiment of the present invention, an application management condition includes carrying out a handover between serving networks. A handover between serving networks may require a downloading of a different set of application identifiers to the mobile device, e.g. an indication of application identifiers required for accessing the mobile device, an indication of application identifiers allotted to the mobile device when served by the new network, and the like.

According to one embodiment of the present invention, an application management condition includes a handover between cells of a serving network. Finally, according to another embodiment of the present invention, an application management condition is constituted by a specific user request to load further application identifiers to the mobile device. A user of the mobile device may for example enter the user request by pressing a certain key or combination of keys at the mobile device.

According to one embodiment of the present invention, an application management condition includes the detection of a new (assigned card device identifier, assigned mobile device identifier) combination. Accordingly, each time a combination of an assigned card device identifier and assigned mobile device identifier differs from a previously received combination of card device identifier and assigned mobile device identifier, information regarding identifiers of applications loaded on the mobile device needs to be obtained. Receiving a new (assigned card device identifier, assigned mobile device identifier) combination indicates that the card device has been inserted into another mobile device.

According to one embodiment of the present invention, an application management condition may also include the fact that new application identifiers or sets of application identifiers become available or are newly supported by the application center or a serving network.

The information acquired in operation 501 may be obtained by the application center through requesting the card device, the mobile control unit, the serving network, or any combination thereof.

In operation 502, it is then determined whether an application management condition is fulfilled. If in operation 502, at least one application management condition is fulfilled, the flow of operations continues at an entry point B in FIG. 4, i.e., the flow of operations continues with operation 420 of FIG. 4 for determining of zero or more allotted application identifiers and zero or more application identifiers of applications loaded on mobile device 450.

If in operation 502, none of the application management conditions are fulfilled, the flow returns to operation 501, i.e., the flow continues to check application management conditions until at least one of the application management conditions is fulfilled.

Turning now to FIG. 6, a flow diagram that illustrates initialization, application management, and application identifier loading methods from the perspectives of a user 675, a card device 680 of a mobile device 690, a mobile control unit 685 of mobile device 690, an application center 695, and a network 697 in accordance with embodiments of the present invention is presented. The processes illustrated in FIG. 6 may be implemented in hardware, software, firmware, or a combination thereof.

Upon being switched "on", mobile control unit 685 of mobile device 690 performs a boot process 600. Mobile device 690 may be switched "on", by way of example, in response to the operation of a power button, the entering of a personal identification number of a user 675, or both. During the boot process of mobile device 690, mobile control unit 685 may also initialize card device 680 inserted into mobile device 690 such as the card device 121 shown in FIG. 1. During or after the boot process 600, in operation 605, mobile control unit 685 sends an identification request including the assigned mobile device identifier to card device 680. The identification request may be transmitted in association with an initialization method exchange between card device 680 and mobile control unit 685.

Card device 680 receives the identification request in operation 610 and stores the received assigned mobile device identifier in operation 615. In operation 617, card device 680 determines whether the mobile device has changed. If the assigned mobile device identifier is included in messages exchanged between mobile control unit 685 and card device 680, an identification unit, such as the identification unit 125 shown in FIG. 1, analyzes the messages to retrieve or determine the assigned mobile device identifier. In an alternative to operation 600, card device 680 can also issue a specific request for the assigned mobile device identifier to mobile control unit 685, e.g. during a boot process or at any other point in time.

Application management may be initiated when application center 625 determines a load event has occurred and then sends a content management request to mobile control unit 685 of mobile device 690. Alternatively, user 675 may initiate application management.

Upon receiving a content management request, in operation 630, mobile control unit 685 sends an application management request to card device 680. In operation 635, card device 680 receives the application management request. In operation 640, card device 680 determines an effective mobile device identifier. According to one embodiment of the present invention, determining the effective mobile device identifier includes performing a lookup operation in a permanent storage unit of card device 680 storing the effective mobile device identifier. As noted before, the effective mobile device identifier may also be transmitted in accordance with existing messages of communication protocols supported by mobile device 690/card device 680 and application center 695.

According to one embodiment of the present invention, the transmission of the effective mobile device identifier is carried out by making use of a secure data transmission path between card device 680 and application center 695. The secure data transmission path between card device 680 and application center 695 may make use of any kind of encryption technique, including public key and shared key mechanisms.

Referring again to FIG. 6, in operation 645, card device 680 composes an application management request response including the effective mobile device identifier and possibly identification of the changed mobile device, and sends the application management request response to mobile control unit 685. In operation 650, mobile control unit 685 receives the application management request response and forwards the effective mobile device identifier to application center 695. In operation 655, application center 695 receives the effective mobile device identifier and forwards it to an application manager, such as application manager 101 shown in FIG. 1. In operation 660, the application manager determines zero or more allotted application identifiers based at least on the effective mobile device identifier. Generally, the identification operation may be as outlined with regard to the embodiment of. FIG. 1 in connection with determining the zero or more allotted application identifiers based at least in part on the effective mobile device identifier.

Process 660 may include determining a type of mobile device 690, card device 680, or both. Process 660 may also include determining a manufacturing code, a manufacturing date, capabilities and other information regarding mobile device 690, card device 680, or both. Obtaining information regarding the type of mobile device 690, card device 680, or both enables selection of a tailored set of application identifiers for the zero or more allotted application identifiers.

Still referring to FIG. 6, the application manager then obtains information regarding a mobile location. The mobile location is a geographical location or region, where mobile device 690 is positioned. For example, the location of mobile device 690 may be determined by interrogating network 697 serving mobile device 690. A location of mobile device 690 may correspond to a base station of network 697 serving mobile device 690, i.e. maintaining communications for a data exchange with mobile device 690. According to another embodiment of the present invention, mobile device 690 includes a GPS (Global Positioning System) device for transmitting the location of mobile device 690.

A location of mobile device 690 may be determined based at least in part on a geographical area served by entire network 697, e.g. corresponding to a state or entire country. The location of mobile device 690 corresponds to a region smaller than the coverage area of a base station, e.g. obtained by triangulation techniques. Operation 660 may include obtaining information regarding network 697, such as a network identifier, one or more services provided by network 697, one or more application identifiers desired by a network operator and other information.

Additionally, operation 660 may include obtaining subscription information pertaining to a user subscription to services, features of services, or both. For example, a subscription could identify an email service, and a subscription of a feature could identify a subscription to an automatic email notification service. Moreover, operation 660 may include determining one or more user preferences, such as user settings of mobile device 690, user setting for obtaining services and other user preferences. For example, a user preference may pertain to a call forwarding service or settings thereof, to an automatic reminder service.

The above information can be collected by application center 695 through inquiring of at least one of card device unit 680, mobile control unit 685 or network 697. Additionally, or in an alternative, the above information may be obtained by performing lookup operations in corresponding registries maintained at application center 695, network 697, or both.

Referring again to operation 660 of FIG. 6, the application manager determines zero or more allotted application identifiers based at least in part on the collected information. Consequently, the zero or more allotted application identifiers may include one or more application identifiers allotted to mobile devices at a certain location. The one or more application identifiers may include application identifiers for providing local information, local news, local traffic information, local information regarding services, such as train schedules, flight departures and other information. Furthermore, one or more of application identifiers of the zero or more allotted application identifiers may be defined in correspondence to a language associated with a location of mobile device 690. Moreover, the zero or more allotted application identifiers may include one or more application identifiers associated with network 697, such as application identifiers pertaining to special services provided by network 697, application identifiers required for accessing network 697 and other application identifiers. Additionally, the zero or more allotted application identifiers may include sets of application identifiers pertaining to a user subscription of services or features thereof, one or more user preferences, or both as noted above.

While the zero or more allotted application identifiers can be permanently stored at application center 695 and updated from time to time, it is also possible that the zero or more allotted application identifiers are determined upon receiving the effective mobile device identifier. According to one embodiment of the present invention, the application manager identifies a type of card device 680 based at least in part on the assigned card device identifier and identifies a type of mobile device 690 based at least in part on the assigned mobile device identifier. Then, the application manager determines at least part of the zero or more allotted application identifiers based at least in part on the type of card device 680, and at least part of the zero or more allotted application identifiers based at least in part on the type of mobile device 690. Consequently, the zero or more allotted application identifiers may include zero or more allotted mobile application identifiers and zero or more allotted card application identifiers.

According to one embodiment of the present invention, the zero or more allotted application identifiers includes all application identifiers allotted by an operator of application center 695 to the (assigned card device identifier, assigned mobile device identifier) combination, e.g. for each specific combination of assigned card device identifier and assigned mobile device identifier. According to another embodiment of the present invention, an operator may allot sets of application identifiers for groups of (assigned mobile device identifier, assigned card device identifier) pairs, e.g. for mobile devices and card devices having certain features or processing capabilities.

Still referring to FIG. 6, in operation 665 the application manager determines zero or more application identifiers of applications loaded on mobile device 690 by obtaining a list of identifiers of applications loaded on mobile device 690 from mobile device 690. The application manager issues a loaded application identifier list request. In operation 670, mobile control unit 685 receives the loaded application identifier list request and returns a loaded application identifier list.

According to one embodiment of the present invention, the indication of identifiers of applications loaded on mobile device 690 includes at least one identifier of the zero or more loaded applications, and may include further information such as a time of loading the respective application, further information regarding the application, such as version of the application and other information.

As shown in FIG. 6, an application manager obtains a loaded application identifier list from mobile control unit 685 of mobile device 690. Alternatively, application center 695 may maintain zero or more application identifiers of applications loaded on the mobile device for each (assigned card device identifier, assigned mobile device identifier) pair. As a further alternative, application center 695 may request the information regarding identifiers of applications loaded on the mobile device from another source, for example from network 697 serving mobile device 690, from any other location, or any combination thereof.

Turning now to FIG. 7, a flow diagram that illustrates application identifier loading methods from the perspectives of a user, a card device of a mobile device, a mobile control unit of the mobile device, an application center, and a network, with particular emphasis on user input regarding loadable application identifiers in accordance with embodiments of the present invention is presented. FIG. 7 is a continuation of FIG. 6. The processes illustrated in FIG. 7 may be implemented in hardware, software, firmware, or a combination thereof. In operation 700, the application manager identifies a mobile device application identifier, a card device application identifier of the zero or more allotted application identifiers, or both, or a plurality of those application identifiers, which do not form part of the zero or more application identifiers of applications loaded on the mobile device, as outlined with regard to previous embodiments. In operation 705, the user input required for loadable application identifiers is determined. In operation 710, a determination is made regarding whether user input is required.

If in operation 710 user input is not required, the unsolicited or "push-type" loading of one or more application identifiers to the mobile device proceeds in operation 800 of FIG. 8.

If in operation 710 user input is required, in operation 715 a selection instruction including a list of application identifiers from which user 775 is to choose or select is sent to mobile control unit 785 of mobile device 790. According to another embodiment of the present invention, the selection instruction includes an indication for an individual application identifier or groups of application identifiers, indicating whether the user should be involved in deciding on loading the respective application identifiers. In this case for example, each application identifier or group of application identifiers could be associated with a user selection instruction flag, which, when set, enables a user interaction when loading the application identifier.

The user selection instruction is transmitted to the mobile device, where it is received in operation 720. The transmission of the user selection instruction may be in physical association with the transmission of operation 800 of FIG. 8, i.e., the user selection instruction can be transmitted together with the application code or identifiers of the applications or indication of applications. However, it is also possible that the user selection instruction is only logically associated with the transmission of operation 800, i.e., the user selection instruction may be transmitted at a later point in time.

According to one embodiment of the present invention, the user selection instruction includes a simple flag which, when set, indicates that user 775 should be involved in selecting the application identifiers to be actually loaded to the mobile device.

In operation 725, the list received from application center 795 is displayed to user 775 and user 775 is prompted to indicate whether to install the application identifier or refrain from installing the application identifier. The user prompt may be displayed on a display unit associated with mobile device 790, e.g. on a display screen of a mobile telephone or mobile computing device. User 775 may make a selection by pressing a predetermined key or predetermined sequence of keys.

In operation 730, mobile control unit 785 receives a user selection from user 775. In operation 735, unselected items are removed from the list received in operation 720 to create a modified list. In operation 740, the modified list is returned to application center 795. In operation 745, application center 795 receives the modified list.

Turning now to FIG. 8, a flow diagram that illustrates application identifier loading methods from the perspectives of a user 875, a card device 880 of a mobile device 890, a mobile control unit 885 of mobile device 890, an application center 895, and a network 897, with particular emphasis on providing a proof of loading in accordance with embodiments of the present invention is presented. FIG. 8 is a continuation of FIG. 7. The processes illustrated in FIG. 8 may be implemented in hardware, software, firmware, or a combination thereof.

In operation 800, application center 895, e.g. via application loader 102 shown in FIG. 1, transmits one or more mobile application identifiers to be loaded on mobile device 890. The one or more mobile application identifiers may be transmitted as one or more sequences of coded instructions. As noted above, priorities may be assigned to application identifiers or groups of application identifiers, and the application identifiers or groups of application identifiers may be transmitted in the order of prioritization. According to one embodiment of the present invention, an available timeframe for transmitting application identifiers, an available amount of data for transmission, or both is determined, and application identifiers are selected for transmission in the order of their priority, until the data limit is reached.

The operations illustrated with regard to FIG. 8 enable a provision of a tailored zero or more allotted application identifiers for a mobile device or a combination of mobile device and card device.

While the operations shown in FIGS. 6-8 are illustrated in a specific order, other sequences of the operations are conceivable, for example determining zero or more application identifiers of applications loaded on the mobile device (operation 665 of FIG. 6) could be carried out after determining zero or more allotted application identifiers (operation 660 of FIG. 6) and before identifying (operation 700 of FIG. 7) and transmitting (operation 800 of FIG. 8).

In operation 805, mobile control unit 885 of mobile device 890 receives the one or more application identifiers. The mobile application identifier may be directly transmitted to mobile control unit 885, through a communication link between mobile device 890 and network 897, and application center 895. In an alternative the mobile application identifier is transmitted through card device 880, i.e., first routed through the receiver of mobile device 890 to card device 880 and then distributed to mobile control unit 885. In this case the transmission of the mobile application identifier may utilize a secure data transmission link between card device 880 and application center 895.

In case of a transmission of only an identifier of the mobile applications, operation 805 may further include retrieving code instructions of the respective applications from another source. This may include retrieving code instructions stored in compressed form in an application library available at mobile device 890 or available at an external location, accessible by mobile device 890.

Still referring to FIG. 8, operation 862 indicates the processes that are performed for each application identifier received in operation 805. In operation 810, a determination is made regarding whether the application identifier received in operation 805 is a reference to a card application. If the application identifier is a card application, in operation 815 the card application is sent to card device 880. In operation 820, card device 880 receives the card application. In operation 825, the card application is committed to card device 880. In operation 830, a proof of loading is sent to mobile control unit 885. In operation 835, mobile control unit 885 receives the proof of loading from card device 880.

If in operation 810, it is determined that the application identifier is not a card application identifier, the application identifier is installed on the mobile device. In operation 860, a proof of loading for the application identifier loaded on the mobile device is determined. According to one embodiment of the present invention, operation 860 includes sending the proof, of loading to card device 880 and requesting that card device 880 confirm the loading of the mobile device application identifier by cryptographically signing the proof of loading and returning the cryptographically signed proof of loading to mobile control unit 885.

Regardless of whether the application identifier is a card device application or a mobile device application, and regardless of whether the proof of loading is cryptographically signed, in operation 840 the proof of loading is sent to application center 895. Application center 895 receives the proof of loading in operation 864. Upon completion of operation 862 for each of the applications received in operation 805, mobile control unit 885 sends a loaded application list to application center 895 in operation 845.

Turning now to FIG. 9, a flow diagram that illustrates application identifier releasing methods from the perspectives of a user 975, a card device 980 of a mobile device 990, a mobile control unit 985 of mobile device 990, an application center 995, and a network 997, with particular emphasis on performing administrative updates in accordance with embodiments of the present invention is presented. FIG. 9 is a continuation of FIG. 8. The processes illustrated in FIG. 9 may be implemented in hardware, software, firmware, or a combination thereof. In operation 900 the loaded application identifier list received in operation 850 of FIG. 8 is used to update the application identifier(s) loaded on the mobile device. In operation 905, application center 995 updates the loaded application identifier register. Operation 905 may simply include entering an identifier of the respective application identifiers into the zero or more application identifiers, loaded on the mobile device but may also include entering further information, such as a point in time of loading the application identifier. Furthermore, the zero or more application identifiers of applications loaded on the mobile device may include information regarding versions of the identifiers of applications loaded on the mobile device, so that it can be identified whether an application identifier at the mobile device needs to be updated. Alternatively, the individual versions of an application identifier may also be treated as separate application identifiers, as noted before.

With the above operations, application identifiers have been installed or loaded to the mobile device, i.e. the card device, the mobile control unit, or both. However, it is also possible that application identifiers need to be released from the card device and the mobile control unit, to increase availability of memory space or if application identifiers are not required any longer for other reasons, such as if a certain service is un-subscribed, if a service provision is terminated at the mobile device, or for other reasons.

Therefore, in an optional operation 970 a release message is transmitted from mobile control unit 985 to application center 995, in case one of the application identifiers is released from mobile control unit 985. Similarly, a release message from card device 980 is transmitted to application center 995 via mobile control unit 985 if an application identifier is released from card device 980. According to one embodiment of the present invention, the released messages include an identifier of the respectively released application identifiers. The messages may be transmitted along the same path as the identifiers, i.e., the released message of mobile device 990 may be routed through card device 980 to the application manager.

In operation 900, upon receiving the released messages from mobile control unit 985, card device 980, or both, the application manager updates the zero or more application identifiers of applications loaded on mobile device in operation 900 and the loaded application identifier register in operation 905. According to one embodiment of the present invention, the update operation includes deleting an identifier of the respectively unloaded applications from the zero or more application identifiers of applications loaded on the mobile device.

Figure 10:
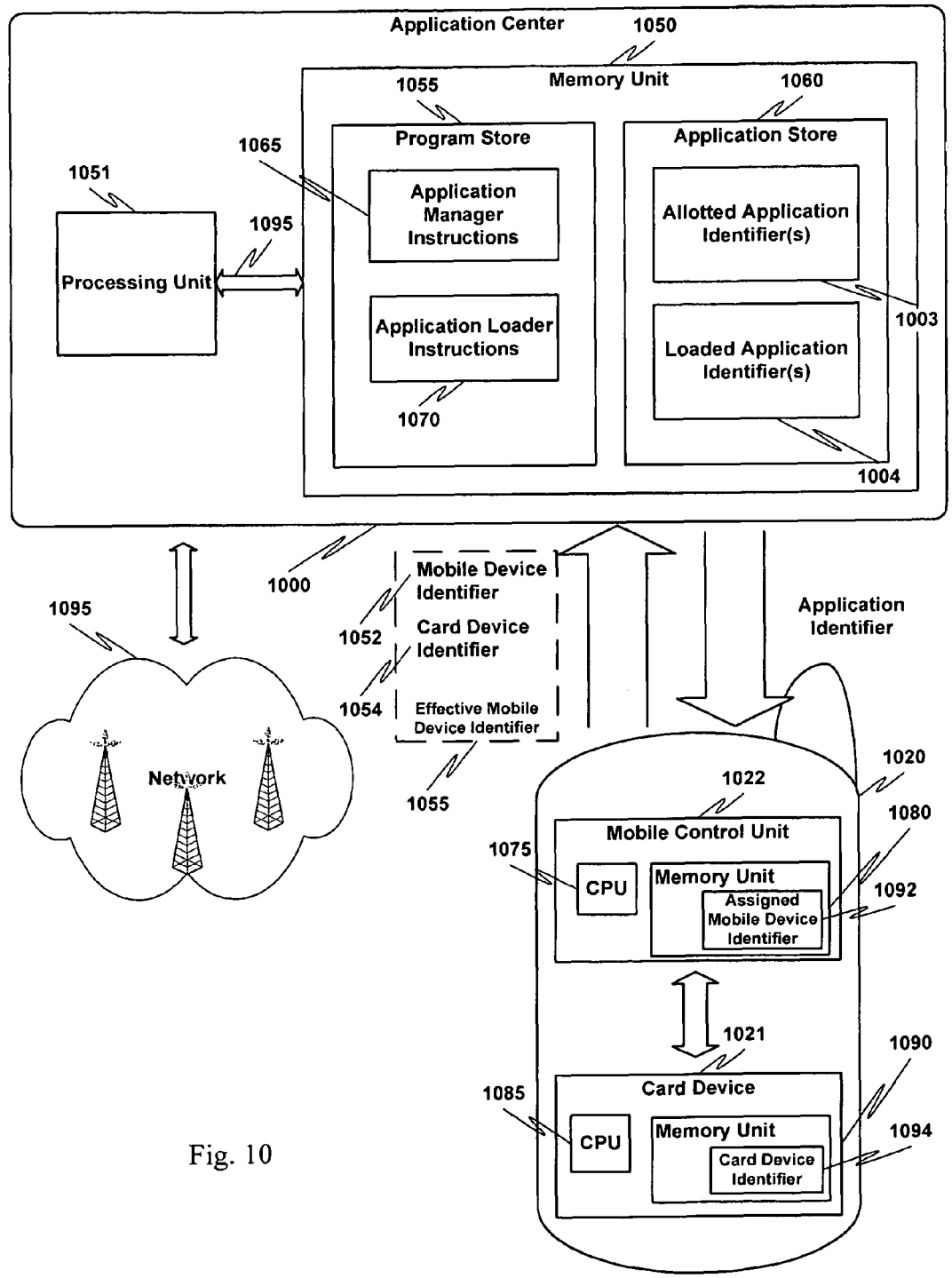
FIG. 10 is a block diagram that illustrates a communication environment in accordance with one embodiment of the present invention, particularly illustrating elements of an application center and a mobile device.

Turning now to FIG. 10, a block diagram that illustrates a communication environment for loading application identifiers to a mobile device in accordance with one embodiment of the present invention is presented. FIG. 10 is similar to FIG. 1, showing more detail of application center 100 and mobile device 120. Objects 100, 103, 104, 120, 122, and 121 of FIG. 1 correspond with objects 1000, 1003, 1004, 1020, 1022, and 1021, respectively, of FIG. 10.

FIG. 10 illustrates an application center 1000 including a memory unit 1050. Memory unit 1050 is subdivided into a program store 1055, and an application store 1060. Program store 1055 and application store 1060 may occupy different portions of memory unit 1050, or may be arranged in physically separate elements of memory unit 1050. Memory unit 1050 may be any kind of memory unit, such as a RAM, a hard disk, optical storage means or combinations thereof.

Furthermore, while memory unit 1050 is shown located at application center 1000, it is also possible that at least portions thereof are located external to application center 1000.

Application store 1060 stores the zero or more allotted application identifiers 1003 and the zero or more application identifiers 1004 of applications loaded on the mobile device, as outlined with regard to previous embodiments.

Furthermore, program store 1055 stores application manager instructions 1065, and application loader instructions 1070. Application manager instructions 1065 and application loader instructions 1070 are constituted by sequences of software instructions which, when loaded into a processing device, make the processing device realize the functionality of application manager 101 and application loader 102 described with regard to FIG. 1 and the other embodiments of the present invention.

Application center 1000 further includes a processing unit 1051 for loading application manager instructions 1065 and application loader instructions 1070, to execute their functionality for loading application identifiers to mobile device 1020. Processing unit 1051 may be constituted by a single unit, or may be constituted by a plurality of interacting processing elements. Processing unit 1051 and memory unit 1050 communicate, line 1095, for example via a system bus, or via communication links between external elements of the processing unit 1051, application center 1000, or both.

FIG. 10 illustrates mobile device 1020, including mobile control unit 1022 and card device 1021.

Card device 1021 includes a memory unit 1090. Memory unit 1090 includes identification unit instructions (not shown in FIG. 10) and request unit instructions (not shown in FIG. 10). The identification unit instructions and the request unit instructions are constituted by software instructions which, when loaded into a processing unit, make the processing unit to realize the functionality of the identification unit (element 125 of FIG. 1) and the request unit (element 126 of FIG. 1), respectively. Furthermore, the card device 1021 includes a central processing unit 1085 for correspondingly loading the identification unit instructions and request unit instructions and executing same. Furthermore, memory unit 1090 is provided for storing further programs of card device 1021, data of card device 1021, or both, and processing unit 1085 realizes further functionality of card device 1021.

Additionally, mobile device 1020 includes mobile control unit 1022, mobile control unit 1022 having a central processing unit 1075 and a memory unit 1080. Memory unit 1080 is provided for storing program instructions to realize, together with central processing unit 1075, the functionality of the mobile control 1022 unit as outlined with regard to the previous embodiments, and for realizing further operations of mobile device 1020.

A program or programs may be provided having instructions adapted to cause a processing unit or a network of data processing units to realize elements of the above embodiments and to carry out the method of at least one of the above operations. Furthermore, a computer readable medium may be provided, in which a program is embodied, where the program is to make a computer execute the method of the above operation.

Also, a computer-readable medium may be provided having a program embodied thereon, where the program is to make a card device to execute functions or operations of the features and elements of the above described examples. A computer-readable medium can be a magnetic or optical or other tangible medium on which a program is recorded, but can also be a signal, e.g. analog or digital, electronic, magnetic or optical, in which the program is embodied for transmission. Furthermore, a data structure or a data stream may be provided including instructions to cause data processing means to carry out the above operations. The data stream or the data structure may constitute the computer-readable medium. Additionally, a computer program product may be provided including the computer-readable medium.

In yet another example, a method for loading applications to a mobile device having an insertable card device includes
  receiving from an application center a selection instruction comprising a list of application identifiers, the list of application identifiers comprising zero or more mobile device application identifiers corresponding to applications loadable to the mobile device, the list of application identifiers further comprising zero or more card device application identifiers corresponding to applications loadable to the card device;
  displaying the list to a user of the mobile device;
  receiving a user selection in response to the displaying, the user selection indicating zero or more of the application identifiers selected for loading to one or more of the mobile device and the card device;
  removing unselected application identifiers from the list application identifiers to create a modified list; and
  sending the modified list to the application center.

This embodiment of the method also includes receiving the application code associated with the application identifiers in physical association with the user selection instruction.

The method further includes receiving the application code associated with the application identifiers after receiving the user selection instruction.

The method also further includes receiving the application code associated with the application identifiers before receiving the user selection instruction.

The method still further includes prompting the user regarding whether to install applications corresponding to the zero or more application identifiers in the list.

The method yet still further includes displaying the user prompt on a display unit associated with the mobile device.

In another embodiment, a system for loading application identifiers to a mobile device having an insertable card device includes:
  a mobile device comprising a mobile control unit;
  a card device insertable into the mobile device, the card device comprising:
    an identification unit for determining an effective mobile device identifier of a mobile device, wherein the effective mobile device identifier is based at least in part on the result of a process performed by the card device; and
    an application request unit for transmitting the effective mobile device identifier,
      wherein the card device is for loading application identifiers to the mobile device; and the card device is insertable into the mobile device; and
  an application center comprising:
    an application manager adapted:
      for receiving an effective mobile device identifier for the mobile device;

for determining zero or more allotted application identifiers and zero or more application identifiers of applications loaded on the mobile device based at least in part on the effective mobile device identifier; and for identifying at least one application identifier of the zero or more allotted application identifiers, which does not form part of the zero or more application identifiers of applications loaded on the mobile device; and an application loader adapted for loading the at least one application identifier to the mobile device.

In still yet a further embodiment, a mobile device includes:
an insertable card device; and
a mobile control unit adapted to:
receive from an application center a selection instruction comprising a list of application identifiers, the list of application identifiers comprising zero or more mobile device application identifiers corresponding to applications loadable to the mobile device, the list of application identifiers further comprising zero or more card device application identifiers corresponding to applications loadable to the card device;
display the list to a user of the mobile device;
receive a user selection in response to the displaying, the user selection indicating zero or more of the application identifiers selected for loading to one or more of the mobile device and the card device;
remove unselected application identifiers from the list application identifiers to create a modified list; and
send the modified list to the application center.

The mobile control unit is further adapted to receive the application code associated with the application identifiers in physical association with the user selection instruction. The mobile control unit is further adapted to receive the application code associated with the application identifiers after receiving the user selection instruction. The mobile control unit is still further adapted to receive the application code associated with the application identifiers before receiving the user selection instruction. The mobile control unit also is further adapted to prompt the user regarding whether to install applications corresponding to the zero or more application identifiers in the list. The mobile control unit is also still further adapted to display the user prompt on a display unit associated with the mobile device.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended Claims.

What is claimed is:

1. A card device for use in loading application identifiers to a mobile device, comprising:
an identification unit for determining an effective mobile device identifier of a mobile device, wherein the effective mobile device identifier of the mobile device is based at least in part
on the result of a process performed by the card device, and
on an assigned mobile device identifier assigned to the mobile device prior to the mobile device being issued to a mobile device user, and further
wherein said assigned mobile device identifier uniquely identifies the mobile device;

an application request unit for transmitting the effective mobile device identifier to an application center;
wherein said card device is used for loading application identifiers to the mobile device, including
receiving, from the application center, one or more application identifiers to be associated with an application to be loaded on the mobile device, and
loading the one or more application identifiers received from the application center, to the mobile device; and
wherein said card device is insertable into the mobile device, and
wherein the identification unit is further adapted to request said assigned mobile device identifier from a mobile control unit of the mobile device in response to a request for the effective mobile device identifier, the card device having processed the assigned mobile device identifier to create the effective mobile device identifier.

2. The card device of claim 1 wherein the effective mobile device identifier comprises one or more of said assigned mobile device identifier and an assigned card device identifier, the assigned card device identifier having been assigned to the card device prior to being issued to a card device user or being configured with the mobile device.

3. The card device of claim 1 wherein the card device establishes a mapping between the effective mobile device identifier and said assigned mobile device identifier.

4. The card device of claim 1 wherein the application request unit is further adapted to receive at least one application identifier and to install the at least one application identifier on at least one of a mobile control unit and the card device.

5. The card device of claim 1 wherein the application request unit is further adapted to receive an application code for loading on at least one of a mobile control unit and the card device.

6. The card device of claim 1 wherein the card device comprises a smart card.

7. A method for loading application identifiers to a mobile device associated with a card device that is insertable into the mobile device, the method comprising:
determining, on the card device, an effective mobile device identifier of the mobile device, wherein the effective mobile device identifier of the mobile device is based at least in part
on the result of a process performed by the card device, and
on an assigned mobile device identifier assigned to the mobile device prior to the mobile device being issued to a mobile device user, and
further wherein said assigned mobile device identifier uniquely identifies the mobile device; and
transmitting, from the card device to an application center, the effective mobile device identifier;
receiving, from the application center, one or more application identifiers to be associated with an application to be loaded on the mobile device; and
loading the one or more application identifiers received from the application center, to the mobile device;
wherein the method further comprises
receiving, on the card device, a capabilities message from a mobile control unit of the mobile device upon a boot process of the mobile device, and
analyzing, on the card device, the capabilities message to obtain the effective mobile device identifier.

8. The method of claim 7 further comprising:
requesting, by the card device, at least one of said assigned mobile device identifier from a mobile control unit of the mobile device during an initialization procedure; and said assigned mobile device identifier from said mobile control unit of the mobile device in response to a request.

9. The method of claim 7 further comprising:

establishing, by the card device, a mapping between the effective mobile device identifier and said assigned mobile device identifier.

10. The method of claim 7 further comprising:

establishing a secure data transmission path; and transmitting at least part of the effective mobile device identifier through the secure data transmission path.

11. The method of claim 7 further comprising:

receiving, on the card device, a request for information regarding identifiers of applications loaded on the mobile device;

obtaining the information regarding identifiers of applications loaded on the mobile device; and transmitting the information.

* * * * *